US012713302B2

(12) United States Patent
Xu et al.

(10) Patent No.: US 12,713,302 B2
(45) Date of Patent: Aug. 18, 2026

(54) DATA TRANSMISSION METHOD AND COMMUNICATION APPARATUS

(71) Applicant: HUAWEI TECHNOLOGIES CO., LTD., Shenzhen (CN)

(72) Inventors: Xiaoying Xu, Shenzhen (CN); Chong Lou, Shanghai (CN); Qiang Fan, Shanghai (CN); Feng Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/632,408

(22) Filed: Apr. 11, 2024

(65) Prior Publication Data

US 2024/0259888 A1 Aug. 1, 2024

Related U.S. Application Data

(63) Continuation of application No. PCT/CN2022/124447, filed on Oct. 10, 2022.

(30) Foreign Application Priority Data

Oct. 13, 2021 (CN) .......................... 202111194082.4

(51) Int. Cl.
*H04W 36/00* (2009.01)
*H04W 76/27* (2018.01)
*H04W 80/02* (2009.01)

(52) U.S. Cl.
CPC ....... *H04W 36/0033* (2013.01); *H04W 76/27* (2018.02); *H04W 80/02* (2013.01)

(58) Field of Classification Search
CPC . H04W 36/0033; H04W 76/27; H04W 80/02; H04W 36/02; H04W 36/023;
(Continued)

(56) References Cited

U.S. PATENT DOCUMENTS

2008/0089287 A1* 4/2008 Sagfors ............... H04W 36/026 370/331
2019/0037457 A1* 1/2019 Jang ................ H04W 36/00692
(Continued)

OTHER PUBLICATIONS

3GPP TS 23.501 V16.3.0 3rd Generation Partnership Project; Technical Specification Group Services and System Aspects; System architecture for the 5G System (5GS); Stage 2 (Release 16), Dec. 2019, total 410 pages.
(Continued)

*Primary Examiner* — Fayyaz Alam
(74) *Attorney, Agent, or Firm* — HAUPTMAN HAM, LLP

(57) ABSTRACT

This application provides a data transmission method and a communication apparatus. The data transmission method includes: A terminal device receives first information from a first access network device, where the first information indicates the terminal device to be handed over and connected to a second access network device. The terminal device sends a first data packet to the second access network device after the terminal device successfully accesses the second access network device, where the first data packet is a data packet that has been sent by the terminal device to the first access network device before the terminal device successfully accesses the second access network device.

20 Claims, 6 Drawing Sheets

(58) Field of Classification Search
CPC ...... H04W 36/185; H04W 36/08; H04L 1/12; H04L 1/1671; H04L 5/0044
See application file for complete search history.

(56) References Cited

U.S. PATENT DOCUMENTS

2024/0129785 A1* 4/2024 Chai ................. H04W 28/0268
2024/0381443 A1* 11/2024 Kim .................... H04W 36/185

OTHER PUBLICATIONS

3GPP TS 38.300 V15.4.0 3rd Generation Partnership Project; Technical Specification Group Radio Access Network; NR; NR and NG-RAN Overall Description; Stage 2 (Release 15), Dec. 2018, total 97 pages.
3GPP TS 38.331 V15.5.1 3rd Generation Partnership Project; Technical Specification Group Radio Access Network; NR; Radio Resource Control (RRC) protocol specification (Release 15), Apr. 2019, total 491 pages.
3GPP TS 38.413 V16.0.0 3rd Generation Partnership Project; Technical Specification Group Radio Access Network; NG-RAN; NG Application Protocol (NGAP) (Release 16), Dec. 2019, total 335 pages.
3GPP TS 38.423 V16.0.0 3rd Generation Partnership Project; Technical Specification Group Radio Access Network; NG-RAN; Xn application protocol (XnAP) (Release 16), Dec. 2019, total 330 pages.
3GPP TS 38.463 V15.4.0 3rd Generation Partnership Project; Technical Specification Group Radio Access Network; NG-RAN; E1 Application Protocol (E1AP) (Release 15), Jul. 2019, total 177 pages.
3GPP TS 38.473 V15.4.1 3rd Generation Partnership Project; Technical Specification Group Radio Access Network; NG-RAN; F1 application protocol (F1AP) (Release 15), Jan. 2019, total 192 pages.

* cited by examiner

DATA TRANSMISSION METHOD AND COMMUNICATION APPARATUS

CROSS-REFERENCE TO RELATED APPLICATIONS

This application is a continuation of International Application No. PCT/CN2022/124447, filed on Oct. 10, 2022, which claims priority to Chinese Patent Application No. 202111194082.4, filed on Oct. 13, 2021. The disclosures of the aforementioned applications are hereby incorporated by reference in their entireties.

TECHNICAL FIELD

Embodiments of this application relate to the field of communication technologies, and in particular, to a data transmission method and a communication apparatus.

BACKGROUND

A mobility interruption time (mobility interruption time) is duration in which a terminal device cannot exchange data with a source base station or a target base station in a handover process in which the terminal device switches from performing communication transmission with the source base station to performing communication transmission with the target base station. Shortening the mobility interruption time helps improve a service and user experience at an application layer in the handover process, and especially, is significant in an ultra-reliable and low-latency service scenario (for example, a multi-party real-time video call and real-time video image transmission).

A dual active protocol stack (dual active protocol stack, DAPS) handover method is introduced in NR R16, so as to implement a handover process with an interruption time of 0 ms. In an example of radio link control (radio link control, RLC) data radio bearer (data radio bearer, DRB) data in an uplink unacknowledged mode (unacknowledged mode, UM), a principle of DAPS handover is as follows: A terminal device keeps communicating with a source base station in a handover process, and after the handover is completed, the terminal device performs new transmission with a target base station (that is, a data packet that has been sent by the terminal device to the source base station cannot be sent to the target base station regardless of whether the data packet is successfully sent). It can be learned that, when the terminal device has sent data to the source base station but does not successfully send the data, the terminal device does not send the data to the target base station. Consequently, there is a risk of a packet loss in the handover process.

SUMMARY

Embodiments of this application provide a data transmission method and a communication apparatus. According to the data transmission method, after a terminal device is handed over from a source access network device and connected to a target access network device, the terminal device can retransmit, to the target access network device, a data packet that has been sent to the source access network device, thereby reducing a packet loss risk in a handover process.

According to a first aspect, an embodiment of this application provides a data transmission method. In the method, a terminal device receives first information from a first access network device, where the first information indicates the terminal device to be handed over and connected to a second access network device; and the terminal device sends a first data packet to the second access network device after the terminal device successfully accesses the second access network device, where the first data packet is a data packet that has been sent by the terminal device to the first access network device before the terminal device successfully accesses the second access network device, and the first data packet is carried on a data radio bearer DRB of unacknowledged mode UM radio link control RLC.

Based on the method described in the first aspect, after the terminal device is handed over and connected to the second access network device (that is, a target access network device), the terminal device may retransmit, to the second access network device (that is, the target access network device), the first data packet that is previously sent to the first access network device (that is, a source access network device). The first data packet is carried on the DRB of UM RLC. In this way, a packet loss risk of the first data packet can be reduced when the terminal device fails to send the first data packet to the source access network device.

In a possible implementation, the first information is further used to configure the terminal device to transmit the first data packet to the second access network device. In this possible implementation, the first access network device (that is, the source access network device) may configure the terminal device to retransmit the first data packet to the target access network device.

In a possible implementation, the terminal device receives second information from the first access network device, where the second information indicates a serial number of the first data packet or a start serial number of the first data packet. In this possible implementation, the terminal device can determine, based on an indication of the first access network device (that is, the source access network device), data packets to be sent to the second access network device (that is, the target access network device). This avoids retransmission of all data packets sent to the first access network device (that is, the source access network device), and saves transmission resources.

In a possible implementation, if the terminal device does not receive second information from the first access network device, and the second information indicates a serial number of the first data packet or a start serial number of the first data packet, the first data packet is a data packet that is on the DRB and that is buffered by the terminal device. In this possible implementation, when the terminal device does not receive an indication of the first access network device (that is, the source access network device), the terminal device determines, as the first data packet, a data packet that is not discarded or does not expire in buffer space of the terminal device, and sends the first data packet to the second access network device (that is, the target access network device), to avoid a packet loss.

In a possible implementation, the first information further indicates that the second access network device determines to use a first data radio bearer DRB for dual active protocol stack DAPS handover, and there are a plurality of first DRBs. In this case, the terminal device may determine at least one second DRB from the plurality of first DRBs based on configuration information of a logical channel associated with each first DRB, where the second DRB is used to transmit the first data packet. In this possible manner, the terminal device may determine, from the plurality of DRBs for transmitting the service data, some DRBs to transmit the first data packet, thereby reducing power consumption of the terminal device.

In a possible implementation, the configuration information of the logical channel includes one or more of the following: a logical channel priority configuration, a physical layer priority index of the logical channel, and a duration threshold of an uplink data channel corresponding to the logical channel.

In a possible implementation, the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device. In this possible implementation, after the terminal device successfully accesses the second access network device (that is, the target access network device), the terminal device may still keep transmitting a data packet to the first access network device (that is, the source access network device). The transmission includes retransmission of the first data packet that has been transmitted to the first access network device (that is, the source access network device), and includes new transmission of the second data packet that has not been transmitted to the first access network device (that is, the source access network device). When a transmission environment (including a transmission environment between the terminal device and the second access network device and/or a transmission environment between the terminal device and the first access network device) of the terminal device is unstable, a packet loss risk can be reduced.

In a possible implementation, the terminal device sends third information to the first access network device when the terminal device detects that downlink reference signal quality of the first access network device is less than or equal to a first threshold, where the third information indicates that the terminal device stops sending the second data packet to the first access network device.

In a possible implementation, the first information further includes first duration, and the terminal device stops, based on the first duration and a moment at which the terminal device successfully accesses the second access network device, sending, to the first access network device, a data packet that has not been sent to the first access network device. In this possible implementation, the terminal device may maintain dual-link transmission (the terminal device maintains both data transmission with the first access network device and data transmission with the second access network device) in an early stage of being handed over and connected to the second access network device (in this case, a connection between the terminal device and the second access network device may be unstable). After the connection between the terminal device and the second access network device is stable, the terminal device no longer maintains data transmission with the first access network device, thereby avoiding a waste of excessive transmission resources.

In a possible implementation, the terminal device may further receive fourth information, where the fourth information indicates the terminal device to stop sending, to the first access network device, a data packet that has not been sent to the first access network device.

According to a second aspect, an embodiment of this application provides another data transmission method. In the method, a first access network device sends a handover request message to a second access network device, where the handover request message carries an identifier of a terminal device; and the first access network device receives a handover acknowledgment message from the second access network device, where the handover acknowledgment message is used to configure the terminal device to transmit a first data packet to the second access network device. The first data packet is a data packet that has been sent by the terminal device to the first access network device before the terminal device successfully accesses the second access network device, and the first data packet is carried on a data radio bearer DRB of unacknowledged mode UM radio link control RLC.

Based on the method described in the second aspect, the first access network device (that is, a source access network device) may configure the terminal device to retransmit the first data packet to the target access network device, so that when the terminal device fails to send the first data packet to the source access network device, a packet loss risk of the first data packet can be reduced.

In a possible implementation, the first access network device sends second information to the terminal device, where the second information indicates a serial number of the first data packet or a start serial number of the first data packet.

In a possible implementation, the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device.

In a possible implementation, the first access network device receives fifth information from the second access network device, where the fifth information indicates that the terminal device successfully accesses the second access network device. The first access network device sends sixth information to the second access network device, where the sixth information indicates an identifier of a data packet that is not received by the first access network device or an identifier of the 1st data packet that is not received by the first access network device.

In a possible implementation, the first access network device sends sixth information to the second access network device at a first moment after the first access network device sends the handover request message to the second access network device, where an interval between the first moment and a moment at which the handover request is sent is second duration, and the sixth information indicates an identifier of a data packet that is not received by the first access network device or an identifier of the 1st data packet that is not received by the first access network device. Alternatively, the first access network device sends sixth information to the second access network device at a second moment after the first access network device sends the handover command to the terminal device, and an interval between the second moment and a moment at which the handover command is sent is third duration. Alternatively, if the first access network device does not receive, within fourth duration, a second data packet sent by the terminal device, the first access network device sends sixth information to the second access network device, where the second data packet is a data packet that has not been sent by the terminal device to the first access network device. Alternatively, the first access network device receives third information from the terminal device, where the third information indicates that the terminal device stops sending, to the first access network device, a data packet that has not been sent to the first access network device; and the first access network device sends sixth information to the second access network device. Alternatively, if the first access network device detects that uplink reference signal quality of the terminal device is less than or equal to a second threshold, the first access network device sends sixth information to the second access network device. In this possible implementation, the second access network device may receive the sixth information from the first access network device in advance, so that a latency in delivering a data packet by the second access network device to a UPF network element based on the sixth information can be shortened, and efficiency of delivering the data packet by the second access network device to the UPF network element can be improved.

In a possible implementation, the handover request message further includes seventh information, and the seventh information indicates the second access network device to deliver the first data packet or the second data packet to a user plane function UPF network element after the second access network device receives the first data packet or the second data packet and before the second access network device receives the sixth information from the first access network device. In this possible implementation, a time for the second access network device (that is, the target access network device) to deliver data can be shortened, and a latency can be reduced. In this possible implementation, the second access network device can deliver the data packet to the UPF without regard to the sixth information from the first access network device, so that a latency in delivering the data packet by the second access network device to the UPF network element can be shortened, and efficiency of delivering the data packet by the second access network device to the UPF network element can be improved.

In a possible implementation, the first access network device sends eighth information to the second access network device, where the eighth information indicates a mapping relationship between an access network serial number and a core network serial number that are corresponding to the first data packet transmitted by the first access network device. In this possible implementation, the second access network device may number, according to a core network serial number numbering rule for the data packet delivered by the first access network device, the data packet to be delivered to the UPF network element, so that the UPF network element can perform repetition detection based on the core network serial numbers, and discard repeated data.

According to a third aspect, an embodiment of this application provides still another data transmission method. In the method, a first access network device sends a handover request message to a second access network device, where the handover request message includes an identifier of a terminal device and seventh information, the seventh information indicates the access network device to deliver a data packet to a user plane function UPF network element before the second access network device receives sixth information from the first access network device, and the sixth information indicates an identifier of a data packet that is not received by the first access network device or an identifier of the 1st data packet that is not received by the first access network device. The first access network device receives a handover acknowledgment message from the second access network device; and the first access network device sends first information to the terminal device, where the first information indicates the terminal device to be handed over and connected to the second access network device, and the first information includes the handover acknowledgment message.

Based on the method described in the third aspect, the second access network device can deliver the data packet to the UPF without regard to the sixth information from the first access network device, so that a latency in delivering the data packet by the second access network device to the UPF network element can be shortened, and efficiency of delivering the data packet by the second access network device to the UPF network element can be improved.

In a possible implementation, the handover acknowledgment message is used to configure the terminal device to transmit a first data packet to the second access network device, the first data packet is a data packet that has been sent by the terminal device to the first access network device before the terminal device successfully accesses the second access network device, and the first data packet is carried on a first data radio bearer DRB of unacknowledged mode UM radio link control RLC.

In a possible implementation, the first access network device sends second information to the terminal device, where the second information indicates a serial number of the first data packet or a start serial number of the first data packet.

In a possible implementation, the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device.

In a possible implementation, the first information further includes first duration, and the first duration is used by the terminal device to stop sending, to the first access network device, a data packet that has not been sent to the first access network device.

In a possible implementation, the first access network device receives fifth information from the second access network device, where the fifth information indicates that the terminal device successfully accesses the second access network device; and the first access network device sends the sixth information to the second access network device.

In a possible implementation, the first access network device sends the sixth information to the second access network device at a first moment after the first access network device sends the handover request message to the second access network device, and an interval between the first moment and a moment at which the handover request is sent is second duration. Alternatively, the first access network device sends the fifth information to the second access network device at a second moment after the first access network device sends the handover command to the terminal device, and an interval between the second moment and a moment at which the handover command is sent is third duration. Alternatively, if the first access network device does not receive, within fourth duration, a second data packet sent by the terminal device, the first access network device sends the sixth information to the second access network device, where the second data packet is a data packet that has not been sent by the terminal device to the first access network device. Alternatively, the first access network device receives third information from the terminal device, where the third information indicates that the terminal device stops sending, to the first access network device, a data packet that has not been sent to the first access network device; and the first access network device sends the sixth information to the second access network device. Alternatively, if the first access network device detects that uplink reference signal quality of the terminal device is less than or equal to a second threshold, the first access network device sends the sixth information to the second access network device.

In a possible implementation, the first access network device sends eighth information to the second access network device, where the eighth information indicates a mapping relationship between an access network serial number and a core network serial number that are corresponding to the first data packet transmitted by the first access network device. In this possible implementation, the second access network device may number, according to a core network serial number numbering rule for the data packet delivered by the first access network device, the data packet to be delivered to the UPF network element, so that the UPF network element can perform repetition detection based on the core network serial numbers, and discard repeated data.

According to a fourth aspect, this application provides a communication apparatus. The apparatus may be an apparatus in a terminal device or an apparatus that can be used together with a terminal device. The communication apparatus may alternatively be a chip system. The communication apparatus may perform the method according to the first aspect. A function of the communication apparatus may be implemented by hardware, or may be implemented by hardware executing corresponding software. The hardware or the software includes one or more units corresponding to the functions. The unit may be software and/or hardware. For operations performed by the communication apparatus and beneficial effects thereof, refer to the method in the first aspect and the beneficial effects thereof. Repeated parts are not described again.

According to a fifth aspect, this application provides a communication apparatus. The apparatus may be an apparatus in a first access network device, or an apparatus that can be used together with a first access network device. The communication apparatus may alternatively be a chip system. The communication apparatus may perform the method according to the second aspect or the third aspect. A function of the communication apparatus may be implemented by hardware, or may be implemented by hardware executing corresponding software. The hardware or the software includes one or more units corresponding to the functions. The unit may be software and/or hardware. For operations performed by the communication apparatus and beneficial effects thereof, refer to the method in the second aspect or the third aspect and the beneficial effects thereof. Repeated parts are not described again.

According to a sixth aspect, this application provides a communication apparatus. The communication apparatus may be the terminal device in the foregoing method embodiments, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the methods performed by the terminal device in the foregoing method embodiments.

According to a seventh aspect, this application provides a communication apparatus. The communication apparatus may be the first access network device in the foregoing method embodiments, or may be a chip disposed in the first access network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the methods performed by the first terminal device in the foregoing method embodiments.

According to an eighth aspect, this application provides a computer-readable storage medium. The computer-readable storage medium is configured to store computer-executable instructions. When the computer-executable instructions are executed, the method performed by the terminal device in the method according to the first aspect is implemented.

According to a ninth aspect, this application provides a computer-readable storage medium. The computer-readable storage medium is configured to store computer-executable instructions. When the computer-executable instructions are executed, the method performed by the network device in the method according to the second aspect or the third aspect is implemented.

According to a tenth aspect, this application provides a computer program product including a computer program. When the computer program is executed, the method performed by the terminal device in the method according to the first aspect is implemented.

According to an eleventh aspect, this application provides a computer program product including a computer program. When the computer program is executed, the method performed by the first access network device in the method according to the second aspect or the third aspect is implemented.

According to a twelfth aspect, this application provides a communication system. The communication system includes the communication apparatus according to the fourth aspect and the communication apparatus according to the fifth aspect.

DESCRIPTION OF EMBODIMENTS

Figure 1:
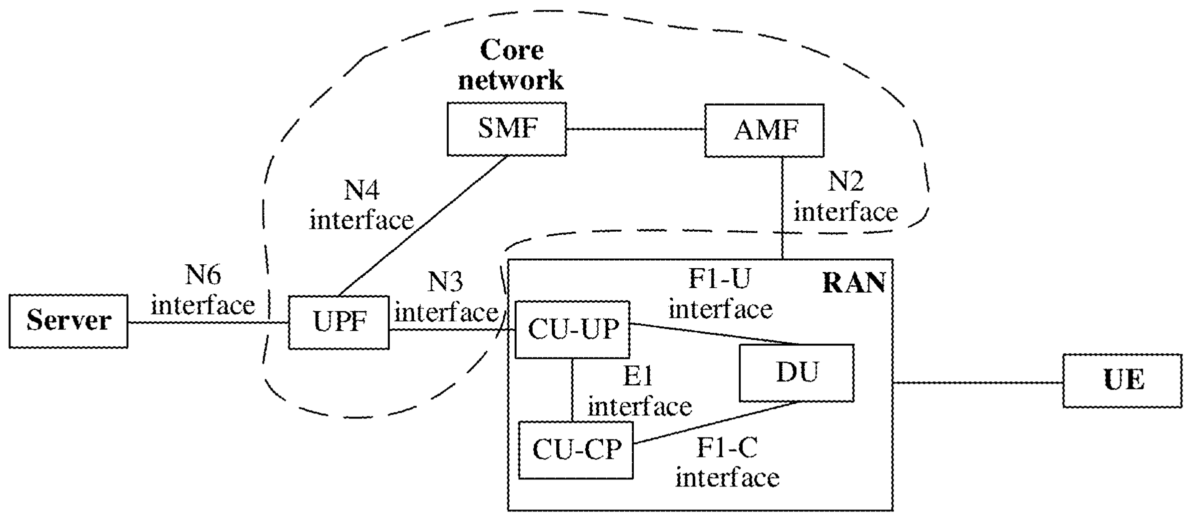
FIG. 1 is a schematic diagram of a system architecture according to this application.

The following further describes specific embodiments of this application in detail with reference to accompanying drawings.

The terms "first", "second", and the like in the specification, claims, and accompanying drawings of this application are used to distinguish between different objects, but are not used to describe a specific sequence. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiment" mentioned in the specification indicates that a particular characteristic, structure or feature described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two or three or more, and "and/or" is used to describe an association relationship between associated objects, which indicates that three relationships may exist. For example, "A and/or B" may indicate: only A exists, only B exists, and both A and B exist. A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand the embodiments of this application, the following first describes a system architecture in the embodiments of this application.

The technical solutions in embodiments of this application may be applied to various communication systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system or a new radio (new radio, NR) system, and a future communication system.

FIG. 1 is a schematic diagram of a system architecture according to an embodiment of this application. As shown in FIG. 1, the system architecture includes a terminal device part, a (radio) access network ((radio) access network, (R)AN), a core network (core network, CN), and a (cloud) server (server). The (cloud) server is configured to provide a device for computing or an application service, the (R)AN (described as a RAN in the following) is configured to connect the terminal device to a wireless network, and the CN is configured to manage the terminal device and provide a gateway for communicating with the server.

The following separately describes in detail the terminal device, the RAN, and the CN in the system architecture in FIG. 1.

1. Terminal Device

The terminal device includes a device that provides voice and/or data connectivity for a user. For example, the terminal device is a device that has a wireless transceiver function, and may be deployed on land, including indoor or outdoor, handheld, wearable, or in-vehicle; or may be deployed on a water surface (for example, on a ship); or may be deployed in the air (for example, on an aircraft, a balloon, or a satellite). The terminal may be a mobile phone (mobile phone), a tablet computer (Pad), a computer with a wireless transceiver function, a virtual reality (VR) terminal device, an augmented reality (AR) terminal device, a wireless terminal in industrial control (industrial control), a vehicle-mounted terminal device, a wireless terminal in self-driving (self-driving), a wireless terminal in remote medical (remote medical), a wireless terminal in smart grid (smart grid), a wireless terminal in transportation safety (transportation safety), a wireless terminal in smart city (smart city), a wireless terminal in smart home (smart home), a wearable terminal device, or the like. An application scenario is not limited in embodiments of this application. Alternatively, the terminal sometimes may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or movable. In this application, UE is used to represent a terminal device in the following.

2. RAN

The RAN may include one or more RAN devices (or referred to as an access network device or a network device), and an interface between the network device and the terminal device may be a Uu interface (or referred to as an air interface). Certainly, in future communication, names of these interfaces may remain unchanged, or may be replaced by other names. This is not limited in this application.

The network device is a node or a device that connects the terminal device to a wireless network. The network device may be any device having a wireless transceiver function, and may include but is not limited to: an evolved NodeB (NodeB or eNB or e-NodeB, evolved NodeB) in LTE, a base station (gNodeB or gNB) or a transmission reception point (Transmission Reception Point, TRP) in NR, a base station evolved in 3GPP, an access node in a Wi-Fi system, a wireless relay node, a wireless backhaul node, and the like. A base station may be a macro base station, a micro base station, a pico base station, a small cell, a relay station, a balloon station, or the like. A plurality of base stations may support networks using a same technology mentioned above, or may support networks using different technologies mentioned above. The base station may include one or more co-site or non-co-site TRPs. Alternatively, the network device may be a radio controller, a central unit (Central Unit, CU), and/or a distributed unit (Distributed Unit, DU) in a cloud radio access network (Cloud Radio Access Network, CRAN) scenario. Alternatively, the network device may be a server, a wearable device, a vehicle-mounted device, or the like. The following uses an example in which the network device is a base station for description. The plurality of network devices may be base stations of a same type, or may be base stations of different types. The base station may communicate with the terminal device, or may communicate with the terminal device through a relay station. The terminal device may communicate with a plurality of base stations using different technologies. For example, the terminal device may communicate with a base station supporting an LTE network, or may communicate with a base station supporting a 5G network, and may further support dual connections to a base station in an LTE network and a base station in a 5G network.

3. CN

The CN may include one or more CN devices. A 5G communication system is used as an example. The CN may include an access and mobility management function (access and mobility management function, AMF) network element, a session management function (session management function, SMF) network element, a user plane function (user plane function, UPF) network element, a policy control function (policy control function, PCF) network element, a unified data management (unified data management, UDM) network element, an application function (application function, AF) network element, and the like. The events are defined as follows:

The AMF network element is a control plane network element provided by an operator network, and is responsible for access control and mobility management for accessing the operator network by a terminal device, for example, including functions such as mobility status management, allocation of a temporary user identity, and user authentication and authorization.

The SMF network element is a control plane network element provided by the operator network, and is responsible for managing a protocol data unit (protocol data unit, PDU) session of a terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes session-related functions such as session management (for example, session establishment, modification, and release, including tunnel maintenance between the UPF and the RAN), selection and control of the UPF network element, service and session continuity (service and session continuity, SSC) mode selection, and roaming.

The UPF network element is a gateway provided by an operator, and is a gateway for communication between the operator network and the DN. The UPF network element includes functions related to a user plane, for example, data packet routing and transmission, packet detection, quality of service (quality of service, QoS) processing, lawful interception, uplink packet detection, and downlink data packet storage.

In addition, although not shown, the CN may further include other possible network elements, such as a network exposure function (network exposure function, NEF) network element, a network repository function (network repository function, NRF) network element, an application function (application function, AF) network element, a unified data repository (unified data repository, UDR) network element, and a network data analytics function (network data analytics function, NWDAF) network element.

In FIG. 1, N2, N3, N6, E1, F1-U, and F1-C are interface serial numbers. For meanings of these interface serial numbers, refer to meanings defined in related standard protocols. This is not limited herein.

For ease of understanding content of the solutions, the following further explains and describes some terms in embodiments of this application, to facilitate understanding by a person skilled in the art.

1. A general packet radio service (general packet radio service, GPRS) is a wireless packet switching technology based on the global system for mobile communications (global system for mobile communications, GSM), and provides end-to-end and wide-area wireless internet protocol (internet protocol, IP) connections.
2. The GPRS tunneling protocol (GPRS tunneling protocol, GTP) is a group of IP-based communication protocols used to carry a GPRS in a GSM network. The GTP includes a control plane protocol (also called GTP-C) and a user plane protocol (GTP-U).
3. Quality of service flow (quality of service flow, QoS flow): Data transmission may be performed between a terminal device and a UPF network element by using a protocol data unit (packet data unit, PDU) session, and a plurality of data flows with different QoS requirements, namely QoS flows, may be transmitted in each PDU session.

4. Handover Procedure

Figure 2:
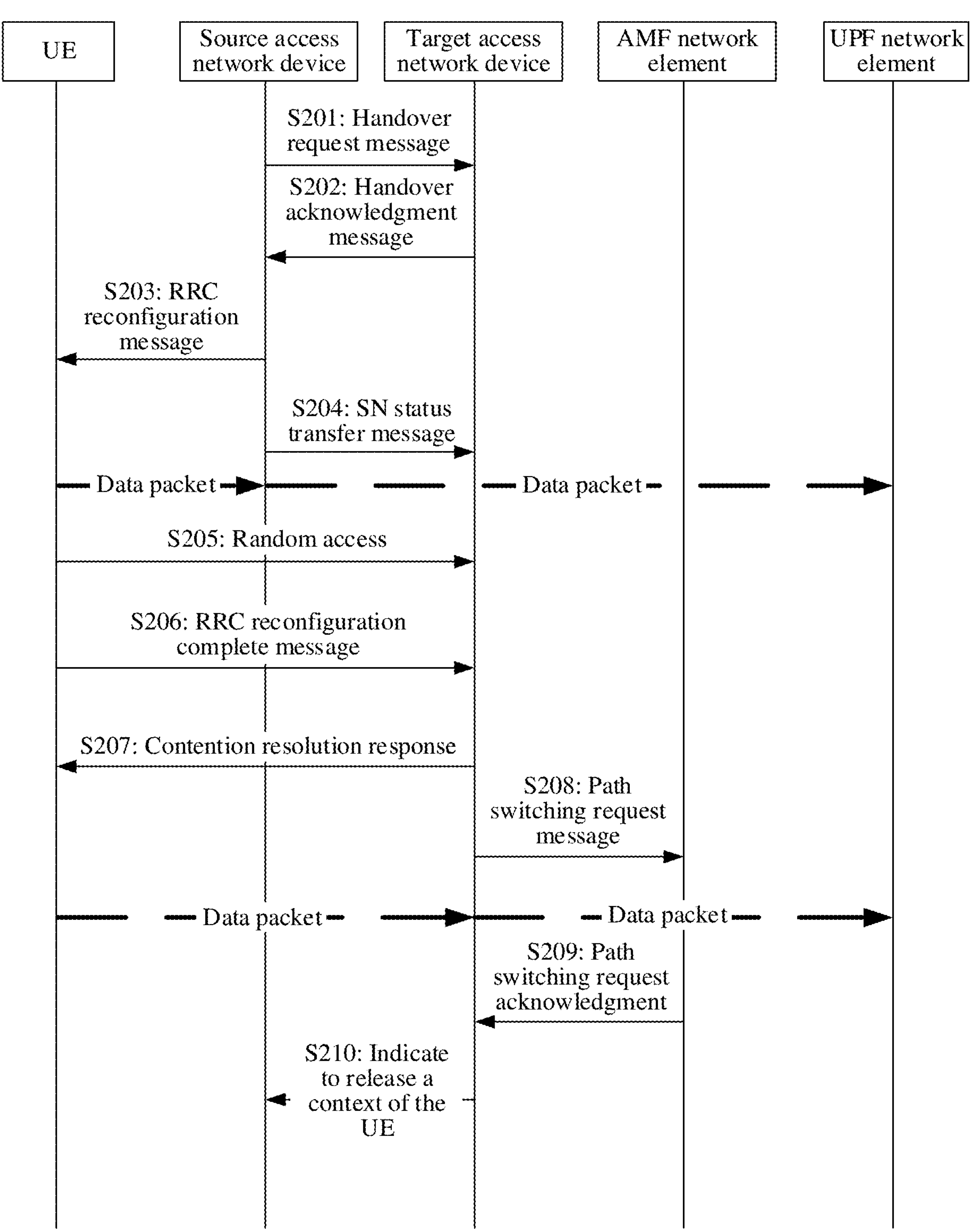
FIG. 2 is a schematic diagram of a handover procedure according to this application.

Mobility management of UE in a connected state is controlled by an access network device. To be specific, the access network device sends a handover message to indicate a cell to which the UE is handed over and how to perform the handover. FIG. 2 shows a handover procedure according to this application. The handover procedure may include the following steps.

S201: A source access network device sends a handover request message to a target access network device, where the handover request message includes an identifier of UE and the like.

S202: The target access network device sends a handover acknowledgment message to the source access network device based on the handover request message.

Specifically, the target access network device determines, based on a status of the target access network device (for example, a quantity of terminals connected to the target access network device), whether to allow access of the UE. If access of the UE is allowed, the target access network device sends a handover acknowledgment message to the source access network device. The handover acknowledgment message includes parameters such as a cell radio network temporary identifier (cell radio network temporary identifier, C-RNTI) of the target access network device and a security-related algorithm of the target access network device.

S203: The source access network device sends a radio resource control (radio resource control, RRC) reconfiguration message (which may be understood as a handover command) to the UE.

After receiving the handover acknowledgment message sent by the target access network device, the source access network device sends the RRC reconfiguration message (handover command) to the UE, to indicate the UE to switch to connecting to the target access network device. The RRC reconfiguration message includes the handover acknowledgment message from S202. In this case, it may be understood as that the source access network device forwards the handover acknowledgment message to the UE (which may be understood as transparent transmission, that is, the source access network device is transparent). Specifically, the RRC reconfiguration message includes related information of the target access network device and a related configuration parameter required for the UE to access the target access network device. For example, the RRC configuration information includes a physical cell identifier (physical cell identifier, PCI) corresponding to the target access network device, the C-RNTI of the target access network device, random access channel (random access channel, RACH) resource information (for example, a dedicated RACH resource and/or a common RACH resource) required for accessing the target access network device, frequency information corresponding to the target access network device, and the like.

S204: The source access network device sends a serial number (Serial Number, SN) status transfer message to the target access network device, to notify the target access network device of a receiving status of uplink data; or the source access network device forwards, to the target access network device, a packet data convergence protocol (packet data convergence protocol, PDCP) service data unit (service Data Unit, SDU) that is not sent in a downlink direction.

S205: The UE initiates random access to the target access network device according to the handover command.

In a conventional handover procedure, in this case, the UE disconnects from the source access network device. Before the UE successfully accesses the target access network device, a temporary interruption occurs in downlink data receiving or uplink data transmission performed by the UE. This interruption duration is a mobility interruption time, and the interruption duration is generally about 40 ms.

It should be learned that before the UE initiates random access to the target access network device, the UE sends a data packet to the source access network device, and then the source access network device sends (or delivers) the data packet received by the source access network device to a UPF network element.

S206: The UE sends an RRC reconfiguration complete message to the target access network device.

S207: The target access network device sends a contention resolution response to the UE, and the UE determines, based on the response, whether the UE successfully accesses the target access network device.

When the UE determines, based on the contention resolution response, that contention resolution succeeds, it is considered that the UE successfully accesses the target access network device.

S208: After receiving a handover complete message of the UE, the target access network device sends a path switching request message to an AMF network element, to indicate the UPF network element to switch a downlink path to the target access network.

It should be noted that S208 may mean that the UE completes handover to the target access network device. That is, after step S208, the UE switches to sending a data packet to the target access network device, and then the target access network device sends (or delivers) the data packet received by the target access network device to the UPF network element.

S209: The target access network device receives a path switching acknowledgment message from the AMF network element.

S210: The target access network device indicates the source access network device to release a context of the UE.

5. Mobility Interruption Time (Mobility Interruption Time)

A mobility interruption time is minimum duration in which UE cannot exchange user plane data with either a source access network device or a target access network device in a handover process. For example, the mobility interruption time in FIG. 2 is a time from a moment at which the UE receives the RRC reconfiguration information (which may be understood as a handover command) to a moment at which the target access network device receives the handover complete message of the UE.

The mobility interruption time affects transmission performance of service data to some extent. For example, in an application scenario (for example, augmented reality (augmented reality, AR)), an uplink data transmission requirement of UE is 60 frames of video images per second, that is, one video frame appears every 16.66 ms, and a rate is 10 Mbps. An air interface transmission latency budget of a complete video frame is 30 ms (baseline), 20 ms, 15 ms, or 60 ms. The air interface transmission latency budget is duration from a moment when an access network device receives data of a frame of image from the UE to a moment when the frame of image is successfully received. When the mobility interruption time is 40 ms, there is a data transmission requirement of two to three frames in the mobility interruption time. However, in this case, because of mobility interruption, transmission performance of the terminal device cannot meet the data transmission requirement.

6. 0 ms Interruption Handover Procedure

To support a low-latency requirement of a service, a 0 ms interruption handover (handover, HO) process is further proposed in 5G. For example, in NR R16, dual active protocol stack (dual active protocol stack, DAPS) handover is introduced, to implement 0 ms mobility interruption for an air interface. A principle is as follows: Before DAPS handover, a source access network device indicates UE to release configurations such as carrier aggregation (carrier aggregation, CA) and dual connectivity (dual connectivity, DC), and only a primary cell of a source access network device is reserved. In the DAPS handover process, the UE always maintains communication with the source access network device. After accessing the target access network device, the UE may continue hybrid automatic repeat request (hybrid automatic repeat request, HARQ) retransmission for the source access network device, and can only perform new uplink transmission of a PDCP SDU for the target access network device (that is, transmit an uplink data packet that is not transmitted with the source access network device).

Specifically, the handover procedure may be divided into two phases: a first phase, that is, a period after the UE receives a handover command and before the UE successfully accesses the target access network device; and a second phase, that is, a period after the UE successfully accesses the target access network device.

Figure 3A:
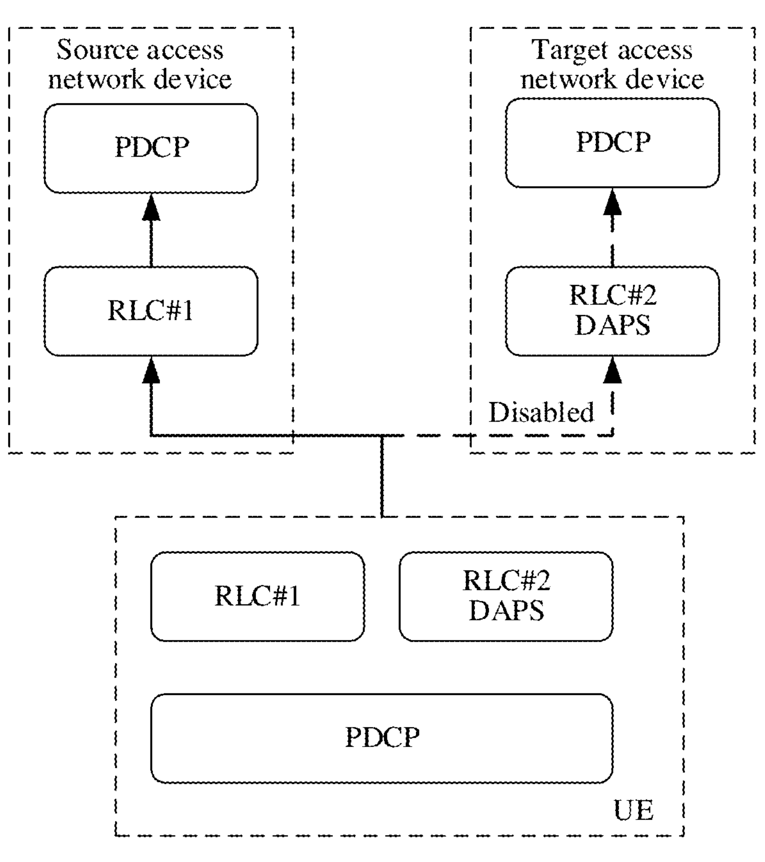
FIG. 3*a* is a schematic diagram of RLC in a handover process according to this application.

In the first phase, that is, after the UE receives the handover command sent by the source access network device (that is, after S203) and before the UE successfully accesses the target access network device (that is, before S208), the UE does not disconnect a link between the UE and the source access network device. FIG. 3*a* is a schematic diagram of radio link control (radio link control, RLC) in a handover process. A network side protocol stack is used as an example. Before the UE successfully accesses the target access network device, RLC #1 established between the UE and the source access network device is still reserved and re-establishment is not required, and the UE establishes new RLC (that is, RLC #2 in FIG. 3*a*) in the target access network device. RLC #1 and RLC #2 are associated with PDCP of a same data radio bearer (data radio bearer, DRB). Before the UE successfully accesses the target access network device, the UE still receives and sends data through an RLC #1 communication link (that is, source access network device PDCP—source access network device RLC #1—source access network device MAC-UE) of the source access network device, and an RLC #2 communication link (that is, target access network device PDCP—target access network device RLC #2—target access network device MAC-UE) of the target access network device is not enabled.

Figure 3B:
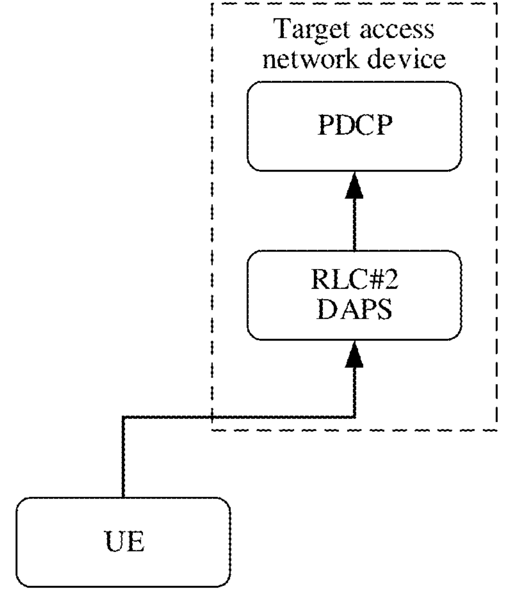
FIG. 3*b* is a schematic diagram of RLC in another handover process according to this application.

In the second phase, that is, after the UE successfully accesses the target access network device (that is, after S208), an uplink communication link of the UE is switched from RLC #1 of the source access network device to RLC #2 of the target access network device. FIG. 3*b* is a schematic diagram of radio link control (radio link control, RLC) in another handover process. The network side protocol stack is used as an example. After the uplink communication link of the UE is switched to RLC #2 of the target access network device, the target access network device indicates, by using an RRC message, the UE to release the communication link (that is, RLC #1) set for the source access network. In this second phase, after the UE successfully switches the uplink to RLC #2 of the target access network device, if the UE does not receive a notification message that is sent by the target access network device and that indicates to release RLC #1, the UE may still perform HARQ retransmission with the source access network device through RLC #1 (in this case, the retransmission may fail because quality of a communication environment between the UE and the source access network device is relatively poor). However, new data packet cannot be transmitted to the source access network device through RLC #1 (the new data packet herein is a data packet that has not been sent to the source access network device when the target access network device is successfully switched to RLC #2). After the UE releases RLC #1 based on the notification message of the access network device, the UE cannot perform retransmission or new transmission through RLC #1, and cannot send a retransmitted data packet through RLC #2 (the retransmitted data packet herein is a data packet that has been sent to the source access network device before the target access network device is successfully switched to RLC #2).

For example, before the UE successfully accesses the target access network device, the UE has sent data packets whose PDCP SDU SNs are 1, 2, and 3 to the source access network device through RLC #1. In this case, when the UE successfully accesses the target access network device, the UE cannot send a data packet whose PDCP SDU SN is greater than or equal to 4 to the source access network device through RLC #1 (that is, cannot send a new data packet to the source access network device), and a data packet whose PDCP SDU SN is 4 or larger than 4 can only be sent to the target access network device through RLC #2 (that is, only a new data packet can be sent to the target access network device). In addition, the UE cannot send the data packets whose PDCP SDU SNs are 1, 2, and 3 to the target access network device through RLC #2 (that is, cannot send a retransmitted data packet to the target access network device).

It can be learned that according to this data transmission method, after the communication link between the UE and the source access network device is released, if a packet loss occurs between the UE and the source access network device, the UE cannot send a retransmitted data packet to the target access network device, thereby increasing a risk of an entire packet loss. For example, the UE sends data packets whose PDCP SDU SNs are 1, 2, and 3 to the source access network device, but the source access network device successfully receives only the data packets whose PDCP SDU SNs are 1 and 2, and the data packet whose PDCP SDU SN is 3 is lost in the transmission process. At this moment, the communication link RLC #1 between the UE and the source access network device is released, and the UE can transmit only a data packet whose PDCP SDU SN is greater than or equal to 4 to the target access network device through RLC #2. The data packet whose PDCP SDU SN is 3 cannot be transmitted to the target access network device through RLC #2, causing a packet loss. In addition, before the communication link between the UE and the source access network device is released, retransmission for a packet loss may fail because quality of communication transmission between the terminal device and the source access network device is relatively poor. Consequently, a packet loss occurs.

In the data transmission method provided in this application, a terminal device may receive preset configuration information or configuration information from an access network device, and retransmit, to a target access network device based on the configuration information, data that has been sent to a source access network device, thereby avoiding the foregoing packet loss. The following further describes, with reference to the accompanying drawings, the data transmission method and the communication apparatus provided in this application.

Figure 4:
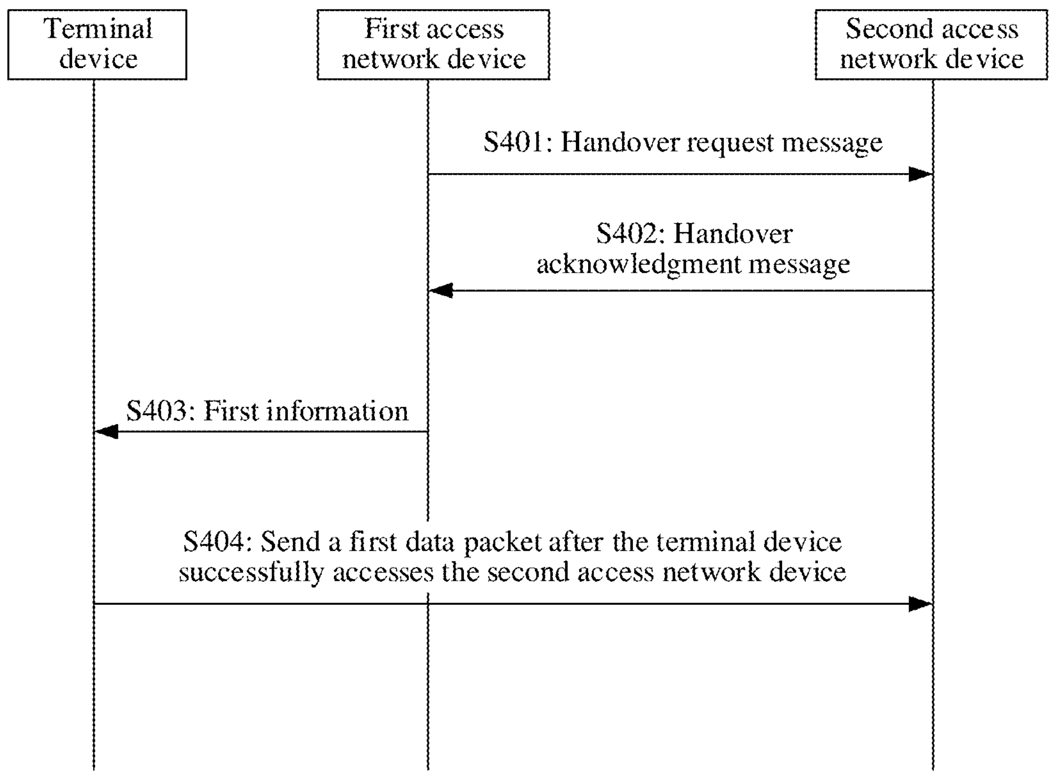
FIG. 4 is a schematic flowchart of a data transmission method according to this application.

FIG. 4 is a schematic flowchart of a data transmission method according to an embodiment of this application. As shown in FIG. 4, the data transmission method may be performed by a terminal device or a chip in a terminal device, or may be performed by a first access network device or a chip in a first access network device, or may be performed by a second access network device or a chip in a second access network device. In FIG. 4, an example in which the terminal device, the first access network device, and the second access network device are execution bodies is used for description.

S401: The first access network device sends a handover request message to the second access network device, where the handover request message carries an identifier of the terminal device.

The first access network device may be understood as a source access network device, and the second access network device may be understood as a target access network device. For example, if the first access network device detects that quality of an uplink reference signal of the terminal device is lower than a preset threshold, the first access network device sends the handover request message to the second access network device, to request to hand over and connect the terminal device to the second access network device. The handover request message carries the identifier (used to uniquely identify the terminal device) of the terminal device, for example, an Xn interface application protocol (application protocol, AP) identifier allocated by the source access network device.

S402: The first access network device receives a handover acknowledgment message from the second access network device.

After receiving the handover request message of the first access network device, the second access network device may determine, based on an access status of the second access network device, whether the second access network device can further connect to another terminal device (which may be understood as a terminal device other than a terminal device currently connected to the second access network device). If the second access network device determines that the second access network device can further connect to another terminal device, the second access network device sends the handover acknowledgment message to the first access network device.

For example, a maximum quantity of terminal devices that can be connected to the second access network device is 5, an actual quantity of terminal devices that are currently connected to the second access network device is 2, and the actual quantity of terminal devices connected to the second access network device is less than the maximum quantity of terminal devices that can be connected to the second access network device. In this case, the second access network device determines that the second access network device can further connect to another terminal device (which also means that the terminal device can be handed over from the first access network device and connected to the second access network device). In this case, the second access network device sends the handover acknowledgment message to the first access network device, to notify the first access network device that the terminal device may be handed over and connected to the second access network device.

In a possible implementation, the handover acknowledgment message further includes a C-RNTI allocated by the second access network device to the terminal, a parameter such as a security-related algorithm configured by the second access network device for the terminal, and a RACH resource (including a dedicated RACH resource and/or a common RACH resource) allocated to the terminal for accessing the second access network device.

S403: The terminal device receives first information from the first access network device.

After receiving the handover acknowledgment message from the second access network device, the first access network device determines that the terminal device can be handed over and connected to the second access network device, and the first access network device sends, to the terminal device, the first information that indicates the terminal device to be handed over and connected to the second access network device. The first information may be RRC configuration information, and may include content in the handover acknowledgment message in S402: the C-RNTI of the target access network device, the parameter such as the security-related algorithm of the target access network device, the RACH resource (including the dedicated RACH resource and/or the common RACH resource) for accessing the second access network device, and the like, so that the terminal device can initiate random access to the second access network device based on the first information, to be handed over and connected to the second access network device.

S404: After the terminal device successfully accesses the second access network device, the terminal device sends a first data packet to the second access network device. The first data packet is a data packet that has been sent by the terminal device to the first access network device before the terminal device successfully accesses the second access network device. In addition, the first data packet is carried on a first DRB of UM RLC.

It should be noted that all data packets (including the first data packet, the second data packet, and the third data packet) mentioned in this application are obtained by processing PDCP SDU data packets. When sending the data packet to a corresponding access network device, the terminal device needs to perform encrypted transmission by using a key of the access network device. In other words, it may mean that when the terminal device sends the first data packet to the first access network device, the terminal device encrypts the first data packet based on a key of the first access network device; and when the terminal device sends the first data packet to the second access network device (that is, retransmits the first data packet to the second access network device), the terminal device transmits the first data packet in an encrypted manner based on a key of the second access network device.

A process in which the terminal device receives the first information from the first access network device and accesses the second access network device based on the first information is the same as the specific implementation process described in S205 to S207. Details are not described herein again. In a possible implementation, after successfully accessing the second access network device, the terminal device may send the first data packet to the second access network device based on preset configuration information (which may be understood as configuration information preset in a protocol) or indication information (or configuration information) from another device. In another possible implementation, the first information in S403 may be further used to configure the terminal device to transmit the first data packet to the second access network device. In other words, it may mean that the first information is further used to configure a function of retransmitting, to the second access network device, a PDCP SDU that is carried on the first DRB and that has been sent by the terminal device to the first access network device. A specific indication form of the first information configuring the terminal device to transmit the first data packet to the second access network device may be indication by using an enumerated variable, or may be indication by using a Boolean variable.

For example, before the terminal device successfully accesses the second access network device, the terminal device has sent data packets whose PDCP SDU SNs are 1, 2, and 3 to the first access network device through RLC #1 (that is, a communication link between the terminal device and the source access network device). When the UE successfully accesses the target access network device, the terminal device determines, based on configuration information specified in a communication protocol in advance (or configuration information from the first access network device), that the terminal device not only can send a data packet whose PDCP SDU SN is greater than or equal to 4 to the second access network device through RLC #2 (that is, a communication link between the terminal device and the second access network device), but also can send a part or all of the data packets whose PDCP SDU SNs are 1, 2, and 3 to the second access network device through RLC #2 (that is, can send, to the second access network device, a data packet that has been sent to the first access network device).

It may be understood that the terminal device needs to first determine the to-be-retransmitted first data packet from data packets that have been sent to the first access network device, and then the terminal device can send the first data packet to the second access network device. The following describes in detail how the terminal device determines the first data packet.

Manner 1: The terminal device receives second information sent by the first access network device, where the second information indicates a serial number of the first data packet or a start serial number of the first data packet.

A serial number of a data packet may be understood as a serial number of a PDCP SDU data packet or a COUNT value of a PDCP SDU data packet, that is, the second information indicates a serial number of a PDCP SDU corresponding to a data packet that is not successfully received by the first network device or indicates a start serial number of a PDCP SDU corresponding to the 1st data packet that is not successfully received by the first network device. The second information may be a PDCP layer message (for example, a PDCP status report), or may be an RRC message (for example, a downlink information transfer message (also referred to as DL information transfer)). This is not specifically limited in this application.

It should be learned that, in a process in which the terminal device sends uplink data to an access network device, a PDCP entity on the terminal device side numbers to-be-uploaded data to obtain a plurality of data packets with consecutive numbers, and then the PDCP entity of the terminal device stores the data packets in buffer space to wait for uploading. Each data packet in the buffer space corresponds to a life cycle (for example, duration of a PDCP discard timer). When a PDCP SDU arrives at a PDCP layer, the discard timer is started. When the life cycle of the data packet expires (that is, the PDCP discard timer expires), the data packet is cleared from the buffer space.

For example, the second information is a PDCP status report. The PDCP status report indicates a serial number of a data packet that fails to be received (or is successfully received) by the first access network device, or indicates a serial number of the 1st data packet that fails to be received by the first access network device. Before the terminal device successfully accesses the second network device, the terminal device has sent data packets whose PDCP SDU SNs are 1, 2, and 3 to the first access network device. The terminal device receives a PDCP status report (that is, the second information) sent by the first access network device. In a possibility, an example in which the second information is a PDCP status report is used. The PDCP status report (that is, the second information) indicates a serial number of the first data packet. In other words, the second information indicates a serial number of each data packet that is not successfully received by the first access network device. For example, the PDCP status report may indicate that the first access network device fails to receive the data packet whose PDCP SDU serial number is 2. In this case, the terminal device determines the data packet whose PDCP SDU serial number is 2 as the first data packet. In another possibility, the example in which the second information is a PDCP status report is still used. The PDCP status report (that is, the second information) indicates a start serial number of the first data packet. In other words, the second information indicates only a serial number of the 1st data packet that is not successfully received by the first access network device. For example, the PDCP status report may indicate that the first access network device fails to receive the data packet whose PDCP SDU serial number is 2. In this case, the terminal device determines the data packet whose PDCP SDU serial number is 2 as the 1st data packet that is not successfully received by the first access network device, and therefore determines the data packet whose PDCP SDU serial number is 2 and the data packet whose PDCP SDU serial number is 3 as the first data packet.

When the first access network device sends, to the terminal device, the first information that indicates the terminal device to be handed over and connected to the second access network device, a transmission environment between the first access network device and the terminal device is usually poor (which may be understood as a high probability of a data transmission failure). Therefore, when the first access network device sends the first information to the terminal device, it is considered that a probability that a data packet subsequently sent to the first access network device fails to be transmitted is relatively high. In this case, an optional implementation of manner 1 is that the second information may be alternatively included in the first information. In other words, when sending, to the terminal device, the first information that indicates the terminal device to be handed over and connected to the second access network device, the first access network device indicates, to the terminal device at the same time, a status of a data packet currently received by the first access network device. In this way, the terminal device can determine the first data packet based on the status of the data packet currently received by the first access network device. That is, when the first access network device sends, to the terminal device, the handover command that indicates the terminal device to be handed over to the second access network device, the first access network device indicates, to the terminal device, a data packet that is successfully received by the first access network device currently (or a data packet that is not successfully received), so that the terminal device determines, as the first data packet, the data packet that fails to be received by the first access network device and a data packet that has not been received by the first access network device currently. In this implementation, a field that is in the first information and that indicates the terminal device to be handed over to the second access network device and a field corresponding to the second information may be sent in a same transport block (Transport Block, TB), or may be sent in different TBs. In other words, the field that indicates the terminal device to be handed over to the second access network device may be sent to the terminal device before (or after or at the same time as) the field corresponding to the second information.

After the first access network device sends the handover command to the terminal device, the terminal device continues to send data to the first access network device until the terminal device successfully accesses the second access network device. Therefore, in another optional implementation of manner 1, the first access network device may send the second information to the terminal device within a period of time after sending the handover command. For example, the first access network device may periodically send the second information to the terminal device after sending the handover command.

Manner 2: If the terminal device does not receive the second information from the first access network device, the first data packet is a data packet that is on the first DRB and that is buffered by the terminal device.

In other words, when the first access network device does not send, to the terminal device, the second information indicating the serial number of the first data packet, the terminal device determines, as the first data packet, a data packet that has been sent to the first access network device and that is carried on the first DRB in the buffer space of the terminal device. It may be understood that the first data packet is a data packet that has been sent to the first access network device and that has not been discarded (that is, whose life cycle has not ended or expired).

For example, before the terminal device successfully accesses the second network device, the terminal device has sent data packets whose PDCP SDU serial numbers are 1, 2, and 3 to the first access network device by using the first DRB, but the first access network device receives only the data packets whose PDCP SDU serial numbers are 1 and 2 (that is, the data packet whose PDCP SDU serial number is 3 is not successfully received). When the terminal device is successfully connected to the second access network device, the data packet whose PDCP SDU serial number is 1 in the buffer space of the terminal device has crossed the life cycle and is cleared. In other words, data packets in the buffer space of the terminal device include data packets whose PDCP SDU serial numbers are 2, 3, and 4. In this case, the terminal device determines, as the first data packet, the data packet whose PDCP SDU serial number is 2 and the data packet whose PDCP SDU serial number is 3 that are carried on the first DRB in the buffer space.

According to the data transmission method provided in FIG. 4, after the terminal device is handed over from the first access network device to the second access network device, the terminal device may retransmit, to the second access network device, data that fails to be received by the first access network device, thereby avoiding a packet loss.

Figure 5:
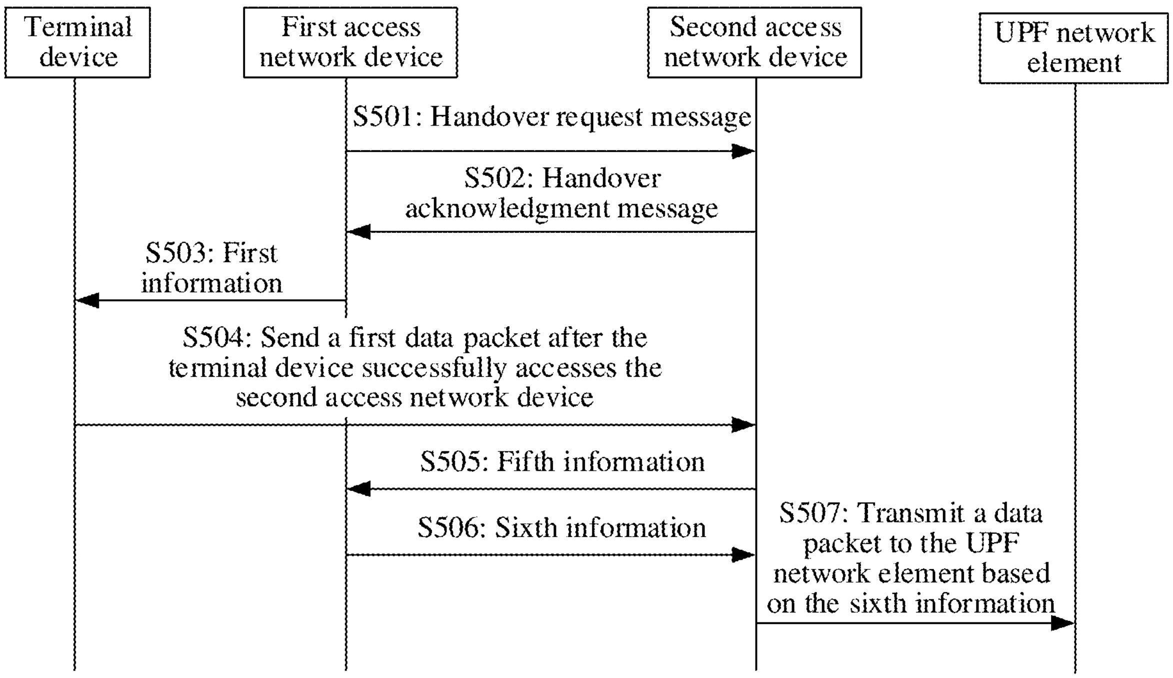
FIG. 5 is a schematic flowchart of another data transmission method according to this application.

However, in the data transmission method provided in FIG. 4, when the terminal device is handed over from the first access network device to the second access network device, if the terminal device disconnects the communication link between the terminal device and the first access network device, a mobility interruption time still exists, thereby increasing a data transmission latency of the terminal device. Further, to avoid a packet loss and shorten a mobility interruption time, this application provides another data transmission method. FIG. 5 is a schematic flowchart of another data transmission method according to an embodiment of this application.

According to the data transmission method shown in FIG. 5, after a terminal device is successfully handed over from a first access network device to a second access network device, the terminal device can retransmit, to the second access network device, a data packet that fails to be received by the first access network device, to avoid a packet loss. In addition, the terminal device can perform 0 ms interruption handover in the handover process. Specifically, as shown in FIG. 5, the data transmission method may be performed by the terminal device or a chip in the terminal device, or may be performed by the first access network device or a chip in the first access network device, or may be performed by the second access network device or a chip in the second access network device. In FIG. 5, an example in which the terminal device, the first access network device, and the second access network device are execution bodies is used for description.

S501: The first access network device sends a handover request message to the second access network device, where the handover request message is used to request to use a first DRB for DAPS handover.

RLC corresponding to the first DRB is UM RLC. The first DRB is one or more of a plurality of DRBs corresponding to the second access network device, and the first DRB is one or more of a plurality of DRBs corresponding to the first access network device. It may be understood that after the first access network device determines the first DRB, the first access network device indicates (or requests) the second access network device to perform DAPS handover on the first DRB.

In other words, the first access network device sends the handover request message to the second access network device, where the handover request message is used to request the terminal device connected to the first access network device to be handed over and connected to the second access network device, and a specific handover manner is DAPS handover on the first DRB. It may be understood that the handover request message carries an identifier of the terminal device and an identifier of the first DRB.

Optionally, the handover request message carries request information, the request information is used to request the second access network device to receive a first data packet transmitted by the terminal, and the first data packet is a data packet that has been sent by the terminal device to the first access network device before the terminal device successfully accesses the second access network device.

S502: The first access network device receives a handover acknowledgment message from the second access network device, where the handover acknowledgment message indicates that the second access network device determines to use the first DRB for DAPS handover.

In other words, after receiving the handover request message from the first access network device, the second access network determines, based on an access status of a terminal device connected to the second access network device, whether the second access network device can further connect to a terminal device (which may be understood as another terminal device other than a terminal device currently connected to the second access network device). If the second access network device can further connect to another terminal device, the second access network device sends the handover acknowledgment message to the first access network device.

In a possible implementation, the handover acknowledgment message is used to configure the terminal device to transmit a first data packet to the second access network device. The first data packet is a data packet that has been sent by the terminal device to the first access network device before the terminal device successfully accesses the second access network device. Alternatively, it means that the handover acknowledgment message includes retransmission configuration information for configuring the first data packet carried on the first DRB to be retransmitted to the second access network device, and the retransmission configuration information is used to configure a function of retransmitting, to the second access network device, a PDCP SDU that is on the first DRB and that has been sent by the terminal device to the first access network device. Specifically, the handover acknowledgment message is used to configure a specific indication form (or a specific indication form of the retransmission configuration information in the handover acknowledgment message) in which the terminal device can transmit the first data packet to the second access network device, which may be an enumerated variable indication or a Boolean variable indication.

For example, when the specific indication form of the retransmission configuration information is an enumerated variable, a value of the enumerated variable may be used to indicate whether the terminal device has a function of retransmitting the first data packet to the second access network device. When the value of the enumerated variable is "enabled", it indicates that the function is enabled (in other words, the terminal device can send the first data packet to the second access network device). When the value is "disabled" or the variable is not configured, it indicates that the function is disabled (in other words, the terminal device cannot send the first data packet to the second access network device). For example, the enumerated variable corresponding to the retransmission configuration information is PDCP SDU Retransmission ENUMERATED. A value of the enumerated variable may be "enabled" or "disabled". In a case of PDCP SDU Retransmission ENUMERATED {enabled}, the value of the enumerated variable is "enabled", indicating that the terminal device can retransmit the first data packet to the second access network device. In a case of PDCP SDU Retransmission ENUMERATED {disabled}, the value of the enumerated variable is "disabled", indicating that the terminal device cannot retransmit the first data packet to the second access network device. When the retransmission configuration information is a Boolean variable, a value of the Boolean variable is "true" or "false". When the value of the Boolean variable is "true", it indicates that the terminal device can retransmit the first data packet to the second access network device. When the value of the Boolean variable is "false", it indicates that the terminal device cannot retransmit the first data packet to the second access network device.

In another possible implementation, the handover acknowledgment message further includes one or more of the following: DAPS handover response indication information, and configuration information of the first DRB associated with the second access network device. The handover response indication information indicates the second access network device to receive a DAPS handover request for the first DRB. The configuration information of the first DRB includes one or more of the following: a radio bearer identifier (used to indicate the first DRB), DAPS configuration information (used to indicate whether the first DRB is a DAPS bearer), PDCP configuration information of the second access network device (used to configure a protocol parameter of a PDCP layer), RLC configuration information of the second access network device (which is used to configure a protocol parameter of an RLC layer, and may include configuration information of one or more RLC entities, where the one or more RLC entities are associated with the first DRB or a PDCP entity of the first DRB), MAC configuration information of the second access network device (used to configure a protocol parameter of a MAC layer), and indication information (indicating the terminal device to retransmit the first data packet to the second access network device).

S503: The terminal device receives first information from the first access network device, where the first information includes the handover acknowledgment information.

In other words, the first information indicates the terminal device to be handed over and connected to the second access network device, and further indicates the terminal device to configure a related function parameter and the like based on the handover acknowledgment information from the second access network device, for example, configure the function of retransmitting the first data packet by the terminal device to the second access network device, configure the first DRB associated with the second access network device, and configure establishment of the PDCP entity of the first DRB associated with the second access network device. The configuring the PDCP entity of the first DRB associated with the second access network device specifically includes but is not limited to: configuring an encryption and protection function of the PDCP entity on the second access network device (that is, performing encryption by using a key of the second access network device and performing integrity protection based on the key of the second access network device during data packet transmission), configuring an internet protocol (Internet Protocol, IP) header compression function of the PDCP entity on the second access network device (that is, performing IP header compression by using a compression configuration of the second access network device), configuring the PDCP entity to be associated with an RLC entity of the second access network device (that is, enabling the first DRB to be associated with both an RLC entity of the first access network device and the RLC entity of the second access network device), and configuring a medium access control (Medium Access Control, MAC) entity of the second access network device (the MAC entity may transmit data of the RLC entity corresponding to the second access network device, and it may be understood that the terminal device may use a MAC entity of the first access network device to transmit data of the RLC entity corresponding to the first access network device, and use the MAC entity of the second access network device to transmit the data of the RLC entity corresponding to the second access network device).

S504: After the terminal device successfully accesses the second access network device, the terminal device sends the first data packet to the second access network device. The first data packet is a data packet that has been sent by the terminal device to the first access network device before the terminal device successfully accesses the second access network device. In addition, the first data packet is carried on the first DRB of UM RLC.

For a specific implementation of S504, refer to the foregoing description of the specific implementation of S404. Details are not described herein again.

In a possible implementation, there are a plurality of first DRBs, and the terminal device determines at least one second DRB from the plurality of first DRBs based on configuration information of a logical channel associated with each first DRB, where the second DRB is used to carry the first data packet. In other words, when there are a plurality of first DRBs for transmitting the first data packet, the terminal device may select, based on the configuration information of the logical channel associated with each first DRB, some first DRBs (that is, the second DRB) from the plurality of first DRBs to carry the first data packet, to avoid simultaneously maintaining the plurality of first DRBs for data transmission and reduce power consumption of the terminal device.

The configuration information of the logical channel includes one or more of the following:

1. Logical Channel Priority Configuration

A logical channel priority ranges from 1 to 16. When the terminal device receives a grant for packet assembly, the terminal device may preferentially perform packet assembly on data on a logical channel with a high logical channel priority based on rankings of logical channel priorities of the first DRBs. For example, the terminal device selects a DRB whose logical channel priority associated with the first DRB is higher than N to perform packet assembly. The first DRBs include a DRB 1, a DRB 2, and a DRB 3. A logical channel priority associated with the DRB 1 is 5, a logical channel priority associated with the DRB 2 is 2, and a logical channel priority associated with the DRB 3 is 1. When N is set to 3, the terminal device determines a first DRB with a high logical channel priority as the second DRB, that is, the DRB 2 and the DRB 3 are second DRBs. The terminal device performs packet assembly on data carried on the DRB 2 and the DRB 3, that is, the DRB 2 and the DRB 3 are used to carry the first data packet.

2. Physical Layer Priority Index of the Logical Channel

For example, a configuration range of a physical layer priority index of a logical channel is (P0, P1), and the first DRBs include a DRB 1 and a DRB 2, where a physical layer priority index of a logical channel associated with the DRB 1 is P0, and a physical layer priority index of a logical channel associated with the DRB 2 is P1. The terminal device selects the DRB (that is, the DRB 2) corresponding to the logical channel with the P1 priority as the second DRB. The terminal device performs packet assembly on data carried on the DRB 2, that is, the DRB 2 is used to carry the first data packet.

3. Duration Threshold of an Uplink Data Channel Corresponding to the Logical Channel For example, a duration range of an uplink data channel corresponding to a logical channel is (0.02 ms, 0.5 ms), and the first DRBs include a DRB 1 and a DRB 2, where a duration threshold of an uplink data channel corresponding to a logical channel of the DRB 1 is 0.02 ms, and a duration threshold of an uplink data channel corresponding to a logical channel of the DRB 2 is 0.5 ms. The terminal device selects, as the second DRB, a first DRB corresponding to a smaller duration threshold of an uplink data channel corresponding to a logical channel. In this case, the terminal device may select the DRB 1 as the second DRB, and the terminal device performs packet assembly on data carried on the DRB 1, that is, the DRB 1 is used to carry the first data packet.

It can be learned that, according to steps S501 to S504 in FIG. 5, after the terminal device is successfully handed over from the first access network device to the second access network device, the terminal device can retransmit, to the second access network device, a data packet that fails to be received by the first access network device, to avoid a packet loss; in addition, the terminal device can perform 0 ms interruption handover in the handover process.

Generally, after the terminal device switches from connecting to the first access network device (a source access network device) to connecting to the second access network device (a target access network device), the following steps are further included.

S505: The first access network device receives fifth information from the second access network device, where the fifth information indicates that the terminal device successfully accesses the second access network device.

It may be understood that after the terminal device successfully accesses the second access network device, the terminal device sends an RRC reconfiguration complete message to the second access network device. Further, the second access network device sends a handover success message (that is, the fifth information) to the first access network device, to indicate that the terminal device has been successfully handed over to the second access network device.

S506: The first access network device sends sixth information to the second access network device, where the sixth information indicates an identifier of a data packet that is not received by the first access network device or an identifier of the $1^{st}$ data packet that is not received by the first access network device.

The first access network device sends the sixth information to the second access network device based on a status of receiving a data packet by the first access network device. The sixth information indicates identifiers of all data packets that are not received by the first access network device, or the sixth information indicates the identifier of the $1^{st}$ data packet that is not received by the first access network device. Further, after receiving the sixth information, the second access network device may determine, based on the sixth information, a delivery sequence of data packets from the terminal device, that is, the $1^{st}$ data packet to be delivered to a UPF network element.

The sixth information may be an SN status transfer message. The identifier of the data packet that is not received by the first access network device is identifiers of a group of data packets that are not successfully received by the first access network device (that is, data packets that the terminal device has sent but the first access network device does not receive, which may be understood as lost data packets). The second access network device may determine, based on the sixth information, the data packets that are from the terminal device and that are to be delivered to the UPF network element. An identifier of an initial data packet that is not received is an identifier of the $1^{st}$ data packet that is not successfully received (that is, the $1^{st}$ data packet that the terminal device has sent but the first access network device does not receive, which may be understood as a lost data packet) in identifiers of a group of data packets that are not received by the first access network device. The second access network device may determine, based on the sixth information, the $1^{st}$ data packet that is to be delivered to the UPF network element and that is in the data packets from the terminal device.

S507: The second access network device transmits a data packet to the UPF network element based on the sixth information.

The second access network device receives data packets from the terminal device. The data packets include a data packet (which may be understood as the foregoing first data packet) that fails to be transmitted to the first access network device before the terminal device successfully connects to the second access network device, and further include a data packet (which may be understood as a second data packet) that is not transmitted to the first access network device after the terminal device successfully connects to the second access network device. When receiving a data packet of the terminal device, the first access network device also delivers the data packet to the UPF network element. After the terminal device accesses the second access network device, the second access network device may deliver, based on an indication of the sixth information, a data packet that is not delivered by the second access network device to the UPF network element, to avoid repetition of delivering the data packet.

In other words, after the first access network device (the source access network device) receives the fifth information indicating that the terminal device is successfully handed over, the first access network device delivers a successfully received data packet to the UPF network element, and then sends the sixth information (for example, SN status transfer information (or referred to as SN Status Transfer)) to the second access network device (that is, the target access network device). Before receiving the sixth information, the second access network device receives the first data packet and the second data packet from the terminal device, and buffers the first data packet and the second data packet. After receiving the sixth information from the first access network device, the second access network device determines, based on the indication of the sixth information, the $1^{st}$ data packet that the second access network device needs to deliver to the UPF network element, and then delivers the data packet to the UPF network element. When the sixth information received by the second access network device is the identifiers of the group of data packets that are not successfully received by the first access network device (that is, data packets that the terminal device has sent but the first access network device does not receive, which may be understood as lost data packets), the second access network device may determine, in the received data packets from the terminal device based on the sixth information, a data packet (that is, a data packet successfully received by the first access network device) that has been delivered by the first access network device to the UPF network element, and the second access network device may discard, from the data packets received from the terminal device, the data packet that has been successfully received by the first access network device, to avoid repeatedly delivering the packet to the UPF. If the sixth information received by the second access network device is the identifier of the $1^{st}$ data packet that is not successfully received (that is, the $1^{st}$ data packet that the terminal device has sent but the first access network device does not receive, which may be understood as a lost data packet) in the identifiers of the group of data packets that are not received by the first access network device, the second access network device may determine, based on the sixth information, to perform packet delivery to the UPF network element starting from this data packet (that is, the $1^{st}$ data packet that is not successfully received).

In the data transmission method provided in FIG. 5, after the second access network device is successfully connected to the terminal device (that is, the second access network device may receive the first data packet and the second data packet from the terminal device), and before the second access network device receives the sixth information, the second access network device cannot deliver the data packet received by the second access network device to the UPF network element. This increases a latency in delivering the data packet by the second access network device to the UPF network element. In some scenarios that have a relatively high requirement on a service data latency (or a relatively high requirement on real-time performance), the service requirement may not be met. Therefore, to reduce the latency in delivering the data packet by the second access network device to the UPF network element, this application further provides some optimized solutions, which specifically include but are not limited to the following solutions.

Solution 1: The first access network device sends the sixth information to the second access network device at a first moment after the first access network device sends the handover request message to the second access network device. An interval between the first moment and a moment at which the handover request message is sent is second duration.

Solution 2: The first access network device sends the sixth information to the second access network device at a second moment after the first access network device sends the first information to the terminal device. An interval between the second moment and a moment at which the first information is sent is third duration.

Solution 3: The first access network device sends the sixth information to the second access network device if the first access network device does not receive, within fourth duration, a third data packet sent by the terminal device, where the third data packet is a data packet that the terminal device has not sent to the first access network device.

Solution 4: The first access network device receives third information from the terminal device, where the third information indicates that the terminal device stops sending, to the first access network device, a data packet that has not been sent to the first access network device. The first access network device sends the sixth information to the second access network device. The third information may be physical layer signaling, for example, a scheduling request signal sent on a dedicated physical uplink control channel resource, a dedicated preamble sequence sent on a common random access channel resource, or a common preamble sequence sent on a dedicated random access channel resource.

Solution 5: The first access network device sends the sixth information to the second access network device if the first access network device detects that uplink reference signal quality of the terminal device is less than or equal to a second threshold.

It should be learned that specific values of the second duration, the third duration, and the fourth duration may be set or adjusted based on a specific application scenario. Specific values of the second duration, the third duration, and the fourth duration are not specifically limited in the solutions.

In conclusion, Solution 1, Solution 2, Solution 3, Solution 4, or Solution 5 may mean that the first access network device can send the sixth information to the second access network device without receiving the fifth information from the second access network device. In other words, a time sequence between a sending moment of the sixth information and a receiving moment of the fifth information is not limited. The first access network device may send the sixth information in advance, so that the second access network device can deliver a data packet to the UPF network element immediately after receiving the data packets from the terminal device, without waiting for receiving the fifth information, thereby shortening a time for the second access network device to deliver the data packet to the UPF network element.

Solution 6: The handover request message further includes seventh information. The seventh information indicates the second access network device to deliver the first data packet or the second data packet to the UPF network element after receiving the first data packet or the second data packet and before receiving the sixth information from the first access network device.

Solution 6 may be understood as follows: The first access network device sends the seventh information to the second access network. The seventh information indicates that after the second access network device receives the data packets (including the first data packet and the second data packet) from the terminal device, the second access network can deliver a data packet to the UPF without regard to the sixth information. In other words, after receiving a data packet, the second access network device may deliver the data packet to the UPF network element. In a possible implementation, the seventh information may be included in the handover request message sent by the first access network device to the second access network device, so as to save communication transmission resources. In this manner, there may be a risk that the first access network device and the second access network device deliver duplicate data to the UPF network element. However, in consideration of a relatively short latency in the handover process and a small amount of duplicate data, when Solution 6 is implemented, an application layer on the receive side may perform repetition detection based on an upper-layer serial number or a timestamp to discard duplicate data.

Specifically, in a possible manner, the second access network device may deliver a data packet to the UPF network element after receiving the data packet (the first data packet or the second data packet) from the terminal device and before sending the fifth information (that is, information indicating that the terminal device successfully accesses the second access network device) to the first access network device. In another possible manner, the second access network device delivers the data packet to the UPF network element after sending the fifth information (that is, information indicating that the terminal device successfully accesses the second access network device) to the first access network device and before receiving the sixth information.

Figure 6:
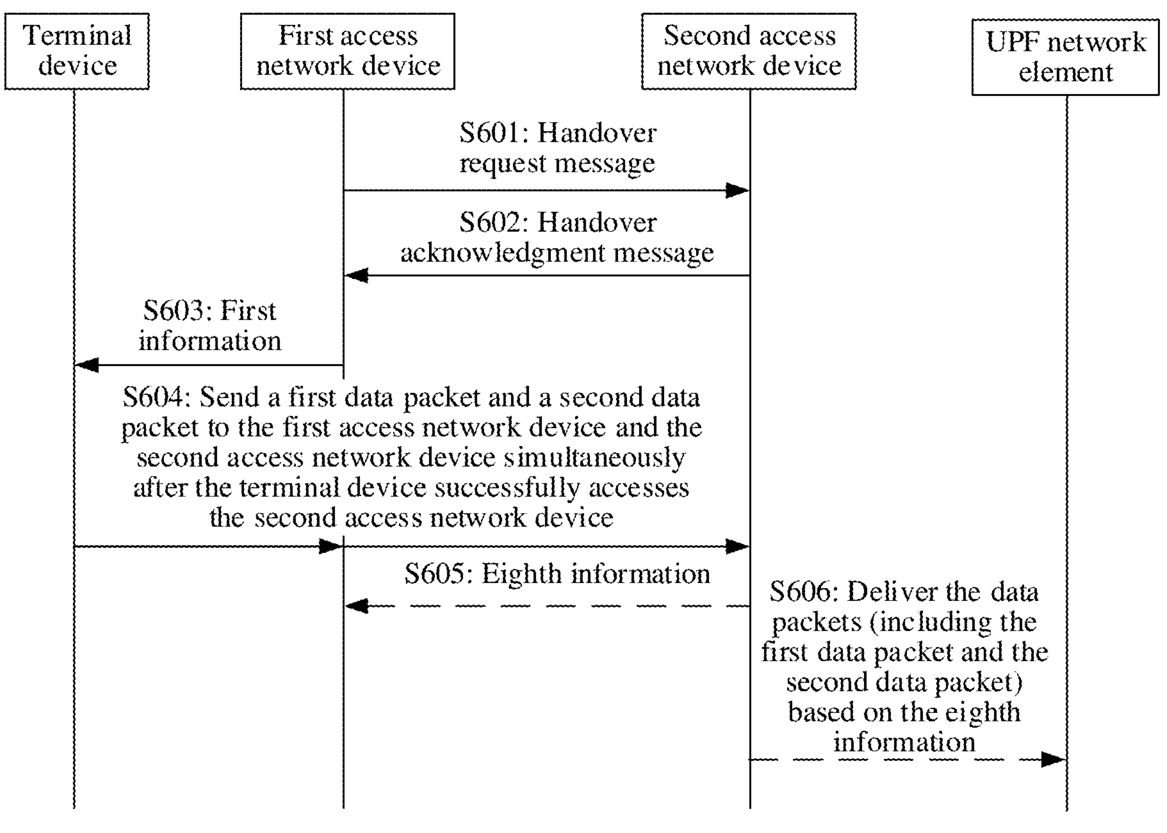
FIG. 6 is a schematic flowchart of still another data transmission method according to this application.

FIG. 6 is a schematic flowchart of still another data transmission method according to an embodiment of this application. According to the data transmission method shown in FIG. 6, after connecting to a second access network device, a terminal device may send a first data packet and a second data packet to the second access network device, and also send the first data packet and the second data packet to a first access network device. According to the data transmission method provided in FIG. 6, stability and reliability of data transmission can be improved in a scenario in which a connection between the terminal device and the second access network device is unstable.

Specifically, as shown in FIG. 6, the data transmission method may be performed by the terminal device or a chip in the terminal device, or may be performed by the first access network device or a chip in the first access network device, or may be performed by the second access network device or a chip in the second access network device. In FIG. 6, an example in which the terminal device, the first access network device, and the second access network device are execution bodies is used for description.

S601: The first access network device sends a handover request message to the second access network device.

For a specific implementation of step S601, refer to the description of the specific implementation of S501. It should be learned that, compared with the handover request message in S501, the handover request message in S601 further includes seventh information. The seventh information indicates the second access network device to deliver a data packet (including a first data packet that fails to be received by the first access network device or a second data packet that has not been sent by the terminal device to the first access network device) to a UPF network element after receiving the data packets (including the first data packet and the second data packet) and before receiving sixth information from the first access network device. The sixth information indicates an identifier of a data packet that is not received by the first access network device or an identifier of the 1$^{st}$ data packet that is not received by the first access network device. It should be understood that the sixth information in this application may be an SN STATUS TRANSFER message or an early status transfer message (also referred to as an EarlySTATUS TRANSFER message). This is applicable in the whole specification unless otherwise specified.

In other words, in addition to the content of the handover request message in S501, the handover request message further includes the seventh information, and the seventh information indicates that the second access network device can deliver the data packet to the UPF network element without a need to wait for the sixth information from the first access network device. In other words, after successfully receiving a data packet, the second access network device may forward uplink data to the UPF network element. For example, the seventh information may indicate the second access network device to: after receiving a data packet from the terminal device and before sending indication information (the indication information indicates that the terminal device is successfully connected to the second access network device) to the first access network device, start to deliver the data packet received by the second access network device to the UPF network element. Alternatively, the seventh information may indicate the second access network device to: after sending indication information (the indication information indicates that the terminal device is successfully connected to the second access network device) to the first access network device and before receiving the sixth information from the first access network device, start to deliver a data packet received by the second access network device to the UPF network element.

In a possible implementation, the handover request message further indicates the second access network device to perform out-of-order delivery when delivering data packets to the UPF network element. In other words, when delivering data packets to the UPF network element, the second access network device does not need to consider a time sequence relationship between the data packets, and may deliver the data packets in a sequence in which the second access network device receives the data packets or another sequence. After receiving the data packets, the UPF network element sorts the data packets and performs operations such as repetition detection based on the time sequence relationship between the data packets.

S602: The first access network device receives a handover acknowledgment message from the second access network device.

For a specific implementation of S602, refer to the description of the specific implementation of S502. Details are not described in this application again.

S603: The terminal device receives first information from the first access network device.

Specifically, for an implementation of S603, refer to the description of the specific implementation of S503. Details are not described in this application again.

In a possible implementation, if the second access network device is associated with a plurality of first DRBs, the first information further includes configuration information of each first DRB. In other words, each first DRB is independently configured. For example, Table 1 shows a configuration of whether each of the plurality of first DRBs associated with the second access network device supports DAPS handover.

TABLE 1

| First DRBs | Whether to support DAPS handover |
|---|---|
| DRB 1 | Yes |
| First DRBs | Whether to support DAPS handover |
| DRB 2 | No |
| DRB 3 | No |

S604: The terminal device sends the first data packet and the second data packet to the first access network device and the second access network device after the terminal device successfully accesses the second access network device. The first data packet and the second data packet are carried on a same first DRB of UM RLC.

For example, data packets that need to be sent by the terminal device include a data packet 1, a data packet 2, a data packet 3, and a data packet 4. Before the terminal device successfully accesses the second access network device, the terminal device has sent the data packet 1 and the data packet 2 to the first access network device. The first access network device successfully receives the data packet 1, but does not receive the data packet 2. It should be understood that the data packet 2 is the first data packet, and the data packet 3 and the data packet 4 are data packets (namely, the second data packet) that have not been sent to the first access network device before the terminal device successfully accesses the second access network device. In this case, after the terminal device successfully accesses the second access network device (that is, the terminal device establishes RLC #2 between the terminal device and the second access network device), the terminal device maintains RLC #1 between the terminal device and the first access network device. The terminal device sends the first data packet (that is, the data packet 2) and the second data packet (that is, the data packet 3 and the data packet 4) to the second access network device through RLC #2, and sends the first data packet (that is, the data packet 2) and the second data packet (that is, the data packet 3 and the data packet 4) to the first access network device through RLC #1.

In an optional implementation, after the terminal device successfully accesses the second access network device, the terminal device may send the first data packet and the second data packet to the second access network device based on preset configuration information (which may be understood as configuration information preset in a protocol) or indication information (or configuration information) from another device. In other words, after successfully accessing the second access network device, the terminal device sends the first data packet and the second data packet to both the first access network device and the second access network device by default.

In another optional implementation, after successfully accessing the second access network device, the terminal device sends the first data packet and the second data packet to the second access network device by default, but does not send the first data packet or the second data packet to the first access network device by default. In this case, compared with the first information in S503, the first information in S603 is further used to configure the terminal device to send the first data packet and the second data packet to the first access network device after the terminal device successfully accesses the second access network device. The first data packet may be understood as a data packet that has been sent (or that fails to be sent) by the terminal device to the first access network device before the terminal device successfully accesses the second access network device (the first data packet is a retransmitted data packet for the first access network device), and the second data packet is a data packet that is not sent by the terminal device to the first access network device before the terminal device successfully accesses the second access network device (the second data packet is a new data packet for the first access network device). In other words, the first access network device sends the first information to the terminal device. In addition to the function and content of the first information in S503, the first information is further used to configure the terminal device to retransmit, to the first access network device, a data packet (the first data packet) that fails to be sent and transmit, to the first access network device, a data packet (the second data packet) that has not been sent to the first access network device, where the retransmission and the transmission are both performed after the terminal device successfully connects to the second access network device.

The data packets sent by the terminal device to the second access network device through RLC #2 are the same as the data packets sent by the terminal device to the first access network device through RLC #1. Although packet losses can be reduced, a waste of communication resources may be caused. To reduce the waste of communication resources as much as possible, this application further provides the following manners to determine when to stop sending, to the first access network device, a data packet that has not been sent to the first access network device.

Manner 1: The first information further includes first duration. Further, the terminal device may stop, based on the first duration and a moment at which the terminal device successfully accesses the second access network device, sending, to the first access network device, a data packet that has not been sent to the first access network device.

In other words, the terminal device starts a timer to start timing from the moment at which the terminal device successfully accesses the second access network device. Before the timing of the timer reaches the first duration, the terminal device not only sends the first data packet and the second data packet to the second access network device, but also sends the first data packet and the second data packet to the first access network device. When the timing of the timer reaches the first duration or after the timing of the timer reaches the first duration, the terminal device sends a data packet (including the first data packet that fails to be sent to the first access network device and a data packet that has not been sent) to only the second access network device, and no longer sends, to the first access network device, a data packet that has not been sent to the first access network device.

For example, data packets that need to be sent by the terminal device include a data packet 1, a data packet 2, a data packet 3, and a data packet 4. Before the terminal device successfully accesses the second access network device, the terminal device has sent the data packet 1 and the data packet 2 to the first access network device. The first access network device successfully receives the data packet 1, but does not receive the data packet 2. The timer is started at a moment when the terminal device successfully accesses the second access network device. Before timing of the timer reaches the first duration, the terminal device sequentially sends the first data packet (that is, the data packet 2) and the second data packet (that is, the data packet 3 and the data packet 4) to the second access network device through RLC #2, and sequentially sends the first data packet (that is, the data packet 2) and the second data packet (that is, the data packet 3 and the data packet 4) to the first access network device through RLC #1. When the timing of the timer reaches the first duration, the terminal device has sent the data packet 2 and the data packet 3 to the first access network device through RLC #1, but has not sent the data packet 4 to the first access network device. After the timing of the timer reaches the first duration, the terminal device stops sending the data packet 4 to the first access network device through RLC #1 (that is, stops sending, to the first access network device, a data packet that has not been sent to the first access network device). If the first access network device fails to receive the data packet 2 or the data packet 3, after the timing of the timer reaches the first duration, the terminal device may still retransmit the data packet 2 or the data packet 3 to the first access network device through RLC #1.

Manner 2: When the terminal device detects that downlink reference signal quality of the first access network device is less than or equal to a first threshold, the terminal device sends third information to the first access network, where the third information indicates (or notifies) that the terminal device stops sending, to the first access network device, a data packet that has not been sent to the first access network device. The first threshold may be set or adjusted based on a specific application scenario. This is not specifically limited in this application.

For example, data packets that need to be sent by the terminal device include a data packet 1, a data packet 2, a data packet 3, and a data packet 4. Before the terminal device successfully accesses the second access network device, the terminal device has sent the data packet 1 and the data packet 2 to the first access network device. The first access network device successfully receives the data packet 1, but does not receive the data packet 2. The terminal device successfully accesses the second access network device. The terminal device sequentially sends the first data packet (that is, the data packet 2) and the second data packet (that is, the data packet 3 and the data packet 4) to the second access network device through RLC #2, and sequentially sends the first data packet (that is, the data packet 2) and the second data packet (that is, the data packet 3 and the data packet 4) to the first access network device through RLC #1. Before detecting that the downlink reference signal quality of the first access network device is less than or equal to the first threshold, the terminal device has sent the data packet 2 and the data packet 3 to the first access network device through RLC #1, but has not sent the data packet 4 to the first access network device. After the terminal device detects that the downlink reference signal quality of the first access network device is less than or equal to the first threshold, the terminal device stops sending the data packet 4 to the first access network device through RLC #1 (that is, stops sending, to the first access network device, a data packet that has not been sent to the first access network device). If the first access network device fails to receive the data packet 2 or the data packet 3, after the terminal device detects that the downlink reference signal quality of the first access network device is less than or equal to the first threshold, the terminal device may still retransmit the data packet 2 or the data packet 3 to the first access network device through RLC #1.

Manner 3: The terminal device receives fourth information, where the fourth information indicates the terminal device to stop sending, to the first access network device, a data packet that has not been sent to the first access network device.

For example, data packets that need to be sent by the terminal device include a data packet 1, a data packet 2, a data packet 3, and a data packet 4. Before the terminal device successfully accesses the second access network device, the terminal device has sent the data packet 1 and the data packet 2 to the first access network device. The first access network device successfully receives the data packet 1, but does not receive the data packet 2. The terminal device successfully accesses the second access network device. The terminal device sequentially sends the first data packet (that is, the data packet 2) and the second data packet (that is, the data packet 3 and the data packet 4) to the second access network device through RLC #2, and sequentially sends the first data packet (that is, the data packet 2) and the second data packet (that is, the data packet 3 and the data packet 4) to the first access network device through RLC #1. Before the terminal device receives the fourth information, the terminal device has sent the data packet 2 and the data packet 3 to the first access network device through RLC #1, but has not sent the data packet 4 to the first access network device. After the terminal device receives the fourth information, the terminal device stops sending the data packet 4 to the first access network device through RLC #1 (that is, stops sending, to the first access network device, a data packet that has not been sent to the first access network device). If the first access network device fails to receive the data packet 2 or the data packet 3, after the terminal device receives the fourth information, the terminal device may still retransmit the data packet 2 or the data packet 3 to the first access network device through RLC #1.

It may be understood that, in a scenario in which the terminal device sends the first data packet and the second data packet to both the first access network device and the second access network device after the terminal device accesses the second access network device, if a signal of the second access network device is poor and a signal of the first access network device is better, the first access network device or the second access network device may send fourth information to the terminal device to indicate the terminal device to stop sending, to the second access network device, a data packet that has not been sent to the second access network device, so as to reduce a waste of communication resources as much as possible. After receiving the fourth information, the terminal stops sending, to the second access network device, a data packet that has not been sent to the second access network device.

In a possible implementation, the first access network device sends sixth information to the second access network device, where the sixth information indicates identifiers of all data packets that are not received by the first access network device or an identifier of the 1st data packet that is not received by the first access network device. For example, the sixth information may be Early STATUS TRANSFER or SN STATUS TRANSFER. It should be learned that, in the data transmission method provided in FIG. 6, the sixth information is mainly used by the second access network device to determine a lower boundary of a receive window for receiving a data packet by the second access network device, and may be understood as being used by the second access network device to determine a serial number of a data packet that is first received by the second access network device.

In conclusion, according to the specific implementations of S601 to S604 in FIG. 6, stability and reliability of data transmission can be improved in a scenario in which a connection between the terminal device and the second access network device is unstable. In addition, because the second access network device no longer needs to transmit a data packet to the UPF network element based on the sixth information from the first access network device, efficiency of delivering a data packet by the second access network device (that is, the target access network device) to the UPF network element is improved.

However, in the foregoing data transmission method, to prevent the first access network device and the second access network device from repeatedly delivering data to the UPF network element, the second access network device needs to wait for the sixth information (for example, SN status transfer information) from the first access network device, and determine, based on the sixth information, a data packet to be delivered to the UPF network element. If the second access network device delivers a data packet received by the second access network device to the UPF network element without regard to the sixth information, the first access network device and the second access network device may deliver duplicate data to the UPF network element. In this case, the data transmission method may be applied to a scenario in which the UPF network element can perform repetition detection on data packets, a scenario in which an application layer has a deduplication function, or an application scenario in which an application server notifies, over a core network, an access network device that duplicate packets are allowed to be transmitted. In other words, in these application scenarios, the second access network device may no longer rely on the sixth information to avoid repeatedly delivering a data packet to the UPF network element. The following uses a scenario in which the UPF network element can perform repetition detection on data packets as an example for description. In other words, S605 and S606 are specific implementation steps of the data transmission method applied to the scenario in which the UPF network element can perform repetition detection on data packets, and are optional steps for other scenarios.

S605: The first access network device sends eighth information to the second access network device, where the eighth information indicates a mapping relationship between an access network serial number and a core network serial number that are corresponding to the first data packet transmitted by the first access network device.

The access network serial number may be understood as a PDCP SDU SN. Service data assembly performed by the terminal device may be understood as determining an access network serial number of each data packet. After the first access network device receives the first data packet from the terminal device, the first access network device sets a core network serial number (for example, a GTP-U SN) for the first data packet, and sends the first data packet to the UPF network element based on the core network serial number. Further, the first access network device sends, to the second access network device, a mapping relationship used to indicate the core network serial number corresponding to the first data packet.

For example, data packets sent by the terminal device are a data packet 1, a data packet 2, a data packet 3, and a data packet 4. An access network serial number of the data packet 1 is PDCP SDU SN=0, an access network serial number of the data packet 2 is PDCP SDU SN=1, an access network serial number of the data packet 3 is PDCP SDU SN=2, and an access network serial number of the data packet 4 is PDCP SDU SN=3. Before the terminal device successfully accesses the second access network device, the terminal device has sent the data packet 1 and the data packet 2 to the first access network device. The first access network device successfully receives the data packet 1, but does not receive the data packet 2. At a moment at which the terminal device successfully accesses the second access network device, the terminal device sequentially sends the first data packet (that is, the data packet 2) and the second data packet (that is, the data packet 3 and the data packet 4) to the second access network device through RLC #2, and sequentially sends the first data packet (that is, the data packet 2) and the second data packet (that is, the data packet 3 and the data packet 4) to the first access network device through RLC #1. Core network serial numbers that are set for the data packets when the first access network device delivers the data packets to the UPF network element are shown in Table 2.

TABLE 2

| Data packet | Access network serial number | Core network serial number |
|---|---|---|
| Data packet 1 | PDCP SDU SN = 0 | GTP-U SN = 0 |
| Data packet 2 | PDCP SDU SN = 1 | GTP-U SN = 1 |
| Data packet 3 | PDCP SDU SN = 2 | GTP-U SN = 2 |
| Data packet 4 | PDCP SDU SN = 3 | GTP-U SN = 3 |

Further, the first access network device sends eighth information to the second access network device: the core network serial number of the data packet 2 (the first data packet) is GTP-U SN=1.

S606: The second access network device delivers the data packets (including the first data packet and the second data packet) to the UPF network element based on the eighth information.

It may be understood that after the second access network device receives the eighth information, the second access network device may set, based on the mapping relationship between the access network serial number and the core network serial number of the first data packet, the same core network serial number for the first data packet received by the second access network device, to ensure that when data packets corresponding to a same service are delivered by different access network devices to the UPF network element, the same data packets are corresponding to a same core network serial number. Further, the UPF network element may perform repetition detection based on the core network serial numbers of the received data packets. In other words, when receiving data packets with a same core network serial number, the UPF network element may determine that the data packets are duplicate data packets.

For example, the data packets sent by the terminal device are a data packet 1, a data packet 2, a data packet 3, and a data packet 4. Before the terminal device successfully accesses the second access network device, the terminal device has sent the data packet 1 and the data packet 2 to the first access network device. The first access network device successfully receives the data packet 1, but does not receive the data packet 2. At a moment at which the terminal device successfully accesses the second access network device, the terminal device sequentially sends the first data packet (that is, the data packet 2) and the second data packet (that is, the data packet 3 and the data packet 4) to the second access network device through RLC #2, and sequentially sends the first data packet (that is, the data packet 2) and the second data packet (that is, the data packet 3 and the data packet 4) to the first access network device through RLC #1. The first access network device sends eighth information to the second access network device: a core network serial number of the data packet 2 (the first data packet whose access network serial number is PDCP SDU SN=1) is GTP-U SN=1. In this case, after receiving the data packet 2 (the first data packet), the second access network device sets a core network serial number of the data packet 2 (whose access network serial number is PDCP SDU SN=1) to GTP-U SN=1, sets a core network serial number of the data packet 3 (whose access network serial number is PDCP SDU SN=2) to GTP-U SN=2, and sets a core network serial number of the data packet 4 (whose access network serial number is PDCP SDU SN=3) to GTP-U SN=3. Further, the second access network device delivers the data packets to the UPF based on the core network serial numbers of the data packets.

According to the data transmission method provided in FIG. 6, it is ensured that a possibility of a packet loss during data transmission is reduced in a handover process of the terminal device, and the second access network device can deliver the data packets to the UPF network element without regard to the sixth information from the first access network device, thereby improving efficiency of delivering the data packets by the second access network device, and reducing a latency.

In an application scenario, after the terminal device is handed over from the first access network device to the second access network device, a connection between the terminal device and the second access network device is unstable. In this application scenario, the second access network device may send ninth information to the terminal device, where the ninth information indicates the terminal device to perform dual-link transmission (that is, send, to the second access network device through RLC #2, a data packet that has not been sent by the terminal device; and send, to the first access network device through RLC #1, the data packet that has not been sent by the terminal device), or indicates the terminal device to send, to only the second access network device through RLC #2, a data packet that has not been sent by the terminal device.

In an example, after the terminal device successfully connects to the second access network device, because the connection between the terminal device and the second access network device is unstable, the terminal device still sends, to the first access network device, a data packet that has not been sent by the terminal device (that is, sends, to the second access network device through RLC #2, a data packet that has not been sent by the terminal device; and sends, to the first access network device through RLC #1, the data packet that has not been sent by the terminal device). In this case, the terminal device receives the ninth information from the second access network device, and the terminal device stops sending, to the first access network device through RLC #1, a data packet that has not been sent by the terminal device, and sends, to only the second access network device through RLC #2, a data packet that has not been sent by the terminal device.

In another example, after successfully connecting to the second access network device, the terminal device sends, to only the second access network device through RLC #2, a data packet that has not been sent by the terminal device. In this case, the terminal device receives the ninth information from the second access network device, and the terminal device sends, to the second access network device through RLC #2, a data packet that has not been sent by the terminal device, and sends, to the first access network device through RLC #1, the data packet that has not been sent by the terminal device.

Figure 7:
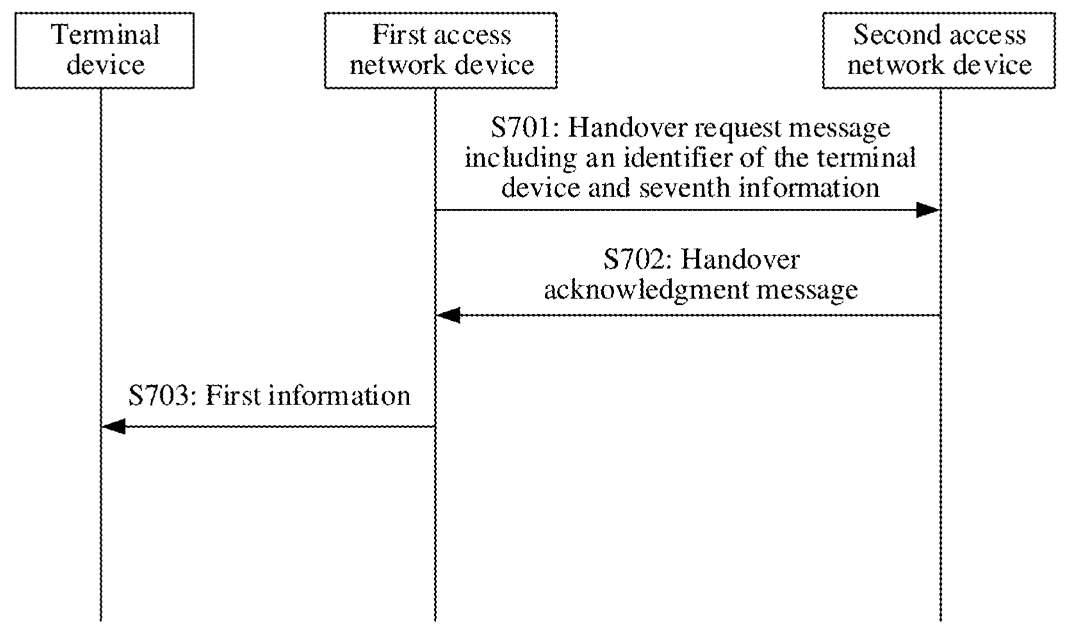
FIG. 7 is a schematic flowchart of still another data transmission method according to this application.

FIG. 7 is a schematic flowchart of still another data transmission method according to an embodiment of this application. According to the data transmission method shown in FIG. 7, efficiency of delivering a data packet by a second access network device (that is, a target access network device) to a UPF network element can be improved. Specifically, as shown in FIG. 7, the data transmission method may be performed by a terminal device or a chip in a terminal device, or may be performed by a first access network device or a chip in a first access network device, or may be performed by the second access network device or a chip in the second access network device. In FIG. 7, an example in which the terminal device, the first access network device, and the second access network device are execution bodies is used for description.

S701: The first access network device sends a handover request message to the second access network device, where the handover request message includes an identifier of the terminal device and seventh information.

The seventh information indicates the second access network device to deliver a data packet to the user plane function UPF network element before receiving sixth information from the first access network device. The sixth information indicates identifiers of all data packets that are not received by the first access network device or an identifier of the $1^{st}$ data packet that is not received by the first access network device.

For a specific implementation of S701, refer to the foregoing description of the specific implementation of S601. Details are not described herein again.

S702: The first access network device receives a handover acknowledgment message from the second access network device.

S703: The first access network device sends first information to the terminal device, where the first information indicates the terminal device to be handed over and connected to the second access network device, and the first information includes the handover acknowledgment message.

For specific implementations of S702 and S703, refer to the foregoing descriptions of the specific implementations of S402 and S403, the foregoing descriptions of the specific implementations of S502 and S503, or the foregoing descriptions of the specific implementations of S602 and S603. Details are not described herein again.

It should be learned that, after step S703, the specific implementation of S404, the specific implementations of S504 to S506, or the specific implementations of S604 to S606 may be further performed.

Figure 8:
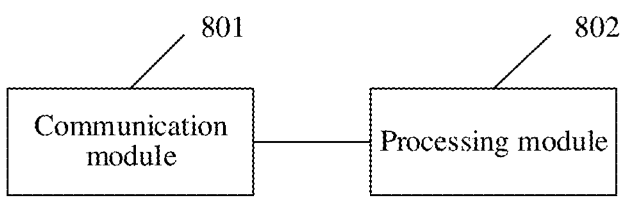
FIG. 8 is a schematic diagram of a structure of a communication apparatus according to this application.

FIG. 8 is a schematic diagram of a structure of a communication apparatus according to an embodiment of this application. The communication apparatus shown in FIG. 8 may be configured to implement some or all functions of the terminal device in the embodiments corresponding to the foregoing data transmission method, or the communication apparatus shown in FIG. 8 may be configured to implement some or all functions of the first access network device in the embodiments corresponding to the foregoing data transmission method.

In an embodiment, the communication apparatus shown in FIG. 8 may be configured to implement some or all functions of the terminal device in the method embodiments described in FIG. 4 to FIG. 7. The apparatus may be a terminal device, an apparatus in the terminal device, or an apparatus that can be used together with the terminal device. The communication apparatus may alternatively be a chip system. The communication apparatus shown in FIG. 8 may include a communication module 801.

The communication module 801 is configured to: receive first information from a first access network device, where the first information indicates the terminal device to be handed over and connected to a second access network device; and send a first data packet to the second access network device after the terminal device successfully accesses the second access network device, where the first data packet is a data packet that has been sent by the terminal device to the first access network device before the terminal device successfully accesses the second access network device, and the first data packet is carried on a first data radio bearer DRB of unacknowledged mode UM radio link control RLC.

In a possible implementation, the first information is further used to configure the terminal device to transmit the first data packet to the second access network device.

In a possible implementation, the communication module 801 is configured to receive second information from the first access network device, where the second information indicates a serial number of the first data packet or a start serial number of the first data packet.

In a possible implementation, if the terminal device does not receive the second information from the first access network device, where the second information indicates the serial number of the first data packet or the start serial number of the first data packet, the first data packet is a data packet that is on the first DRB and that is buffered by the terminal device.

In a possible implementation, the communication apparatus may further include a processing module 802, and the processing module 802 is configured to perform data processing. The first information further indicates that the second access network device determines to use the first DRB for dual active protocol stack DAPS handover, and there are a plurality of first DRBs. The processing module 802 is configured to determine at least one second DRB from the plurality of first DRBs based on configuration information of a logical channel associated with each first DRB, where the second DRB is used to carry the first data packet.

In a possible implementation, the configuration information of the logical channel includes one or more of the following: a logical channel priority configuration, a physical layer priority index of the logical channel, and a duration threshold of an uplink data channel corresponding to the logical channel.

In a possible implementation, the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device.

In a possible implementation, when the terminal device detects that downlink reference signal quality of the first access network device is less than or equal to a first threshold, the communication module 801 is further configured to send third information to the first access network device, where the third information indicates that the terminal device stops sending, to the first access network device, a data packet that has not been sent to the first access network device.

In a possible implementation, the first information further includes first duration, and the processing module 802 is further configured to stop, based on the first duration and a moment at which the terminal device successfully accesses the second access network device, sending, to the first access network device, a data packet that has not been sent to the first access network device.

In a possible implementation, the communication module 801 is further configured to receive fourth information, where the fourth information indicates the terminal device to stop sending, to the first access network device, a data packet that has not been sent to the first access network device.

For more detailed descriptions of the communication module 801 and the processing module 802, refer to related descriptions of the terminal device in the foregoing method embodiments. Details are not described herein again.

In another embodiment, the communication apparatus shown in FIG. 8 may be configured to implement some or all functions of the first access network device in the method embodiments described in FIG. 4 to FIG. 7. The apparatus may be the first access network device, or may be an apparatus in the first access network device, or may be an apparatus that can be used together with the first access network device. The communication apparatus may alternatively be a chip system. The communication apparatus shown in FIG. 8 may include a communication module 801.

The communication module 801 is configured to: send a handover request message to a second access network device, where the handover request message carries an identifier of a terminal device; receive a handover acknowledgment message from the second access network device, where the handover acknowledgment message is used to configure the terminal device to transmit a first data packet to the second access network device, the first data packet is a data packet that has been sent by the terminal device to the first access network device before the terminal device successfully accesses the second access network device, and the first data packet is carried on a first data radio bearer DRB of unacknowledged mode UM radio link control RLC; and send first information to the terminal device, where the first information indicates the terminal device to be handed over and connected to the second access network device, and the first information includes the handover acknowledgment message.

In a possible implementation, the communication module 801 is configured to send second information to the terminal device, where the second information indicates a serial number of the first data packet or a start serial number of the first data packet.

In a possible implementation, the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device.

In a possible implementation, the first information further includes first duration, and the first duration is used by the terminal device to stop sending, to the first access network device, a data packet that has not been sent to the first access network device.

In a possible implementation, the communication module 801 is configured to receive fifth information from the second access network device, where the fifth information indicates that the terminal device successfully accesses the second access network device.

In a possible implementation, the communication module 801 is configured to send sixth information to the second access network device, where the sixth information indicates an identifier of a data packet that is not received by the first access network device or an identifier of the 1st data packet that is not received by the first access network device.

In a possible implementation, the communication module 801 is configured to send sixth information to the second access network device at a first moment after the first access network device sends the handover request message to the second access network device, where an interval between the first moment and a moment at which the handover request message is sent is second duration, and the sixth information indicates an identifier of a data packet that is not received by the first access network device or an identifier of the 1st data packet that is not received by the first access network device.

Alternatively, the communication module 801 is configured to send sixth information to the second access network device at a second moment after the first access network device sends the first information to the terminal device, where an interval between the second moment and a moment at which the first information is sent is third duration.

Alternatively, the communication module 801 is configured to send sixth information to the second access network device if the first access network device does not receive, within fourth duration, a third data packet sent by the terminal device, where the third data packet is a data packet that has not been sent by the terminal device to the first access network device.

Alternatively, the communication module 801 is configured to receive third information from the terminal device, where the third information indicates that the terminal device stops sending, to the first access network device, a data packet that has not been sent to the first access network device; and the first access network device sends sixth information to the second access network device.

Alternatively, the communication module 801 is configured to send sixth information to the second access network device if it is detected that uplink reference signal quality of the terminal device is less than or equal to a second threshold.

In a possible implementation, the handover request message further includes seventh information, the seventh information indicates the second access network device to deliver the first data packet or the second data packet to a UPF network element after the second access network device receives the first data packet or the second data packet and before the second access network device receives sixth information from the first access network device, and the sixth information indicates an identifier of a data packet that is not received by the first access network device or an identifier of the 1st data packet that is not received by the first access network device.

In a possible implementation, the communication module 801 is configured to send eighth information to the second access network device, where the eighth information indicates a mapping relationship between an access network serial number and a core network serial number that are corresponding to the first data packet transmitted by the first access network device.

For more detailed descriptions of the communication module 801 and the processing module 802, refer to related descriptions of the first access network device in the foregoing method embodiments. Details are not described herein again.

Figure 9:
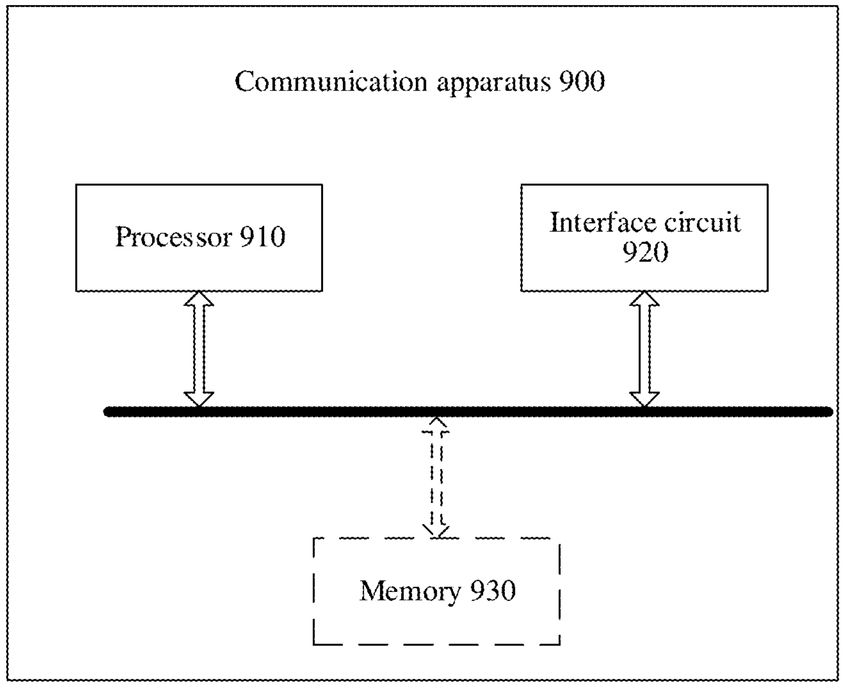
FIG. 9 is a schematic diagram of a structure of another communication apparatus according to this application.

FIG. 9 is a schematic diagram of a structure of a communication apparatus 900 according to this application. The communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store instructions executed by the processor 910, or store input data required by the processor 910 to run instructions, or store data generated after the processor 910 runs instructions.

When the communication apparatus 900 is configured to implement the method in the foregoing method embodiment, the processor 910 is configured to perform the functions of the processing module 802, and the interface circuit 920 is configured to perform the functions of the communication module 801.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a first access network device or another network device to the terminal device; or the chip in the terminal device sends information to another module (for example, the radio frequency module or the antenna) in the terminal device, where the information is sent by the terminal device to the first access network device or the another network device.

When the communication apparatus is a chip used in a first access network device, the chip in the first access network device implements the functions of the first access network device in the foregoing method embodiments. The chip in the first access network device receives information from another module (for example, a radio frequency module or an antenna) in the first access network device, where the information is sent by a terminal device to the first access network device; or the chip in the first access network device sends information to another module (for example, the radio frequency module or the antenna) in the first access network device, where the information is sent by the first access network device to the terminal device.

It may be understood that, the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (random access memory, RAM), a flash memory, a read-only memory (Read-Only Memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in an access network device or a terminal device. Certainly, the processor and the storage medium may alternatively exist in the first access network device or the terminal device as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, or other programmable apparatuses. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state disk (solid-state disk, SSD).

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The serial numbers of the foregoing processes do not mean execution sequences, and the execution sequences of the processes should be determined based on functions and internal logic of the processes.

An embodiment of this application further provides a computer-readable storage medium. The computer-readable storage medium stores computer-executable instructions. When the computer-executable instructions are executed, the methods performed by the terminal device in the foregoing method embodiments are implemented.

An embodiment of this application further provides a computer-readable storage medium. The computer-readable storage medium stores computer-executable instructions. When the computer-executable instructions are executed, the methods performed by the network device in the foregoing method embodiments are implemented.

An embodiment of this application further provides a computer program product. The computer program product includes a computer program. When the computer program is executed, the methods performed by the terminal device in the foregoing method embodiments are implemented.

An embodiment of this application further provides a computer program product. The computer program product includes a computer program. When the computer program is executed, the methods performed by the first access network device in the foregoing method embodiments are implemented.

An embodiment of this application further provides a communication system. The communication system includes a terminal device or a first access network device. The terminal device is configured to perform the methods performed by the terminal device in the foregoing method embodiments. The first access network device is configured to perform the methods performed by the first access network device in the foregoing method embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

Description of the embodiments provided in this application may refer to each other, and description of the embodiments has different focuses. For a part not described in detail in an embodiment, refer to related description in another embodiment. For ease of description and brevity, for functions and performed steps of the apparatuses and devices provided in embodiments of this application, refer to related description in the method embodiments of this application. Mutual reference, combination, or reference may be made between the method embodiments and between the apparatus embodiments.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A data transmission method at a terminal device, wherein the method comprises:

receiving first information from a first access network device, wherein the first information indicates the terminal device to be handed over and connected to a second access network device; and sending a first data packet to the second access network device after the terminal device successfully accesses the second access network device, wherein the first data packet is a data packet that has been sent by the terminal device to the first access network device before the terminal device successfully accesses the second access network device, and the first data packet is carried on a first data radio bearer (DRB) of unacknowledged mode (UM) radio link control (RLC).

2. The method according to claim 1, wherein the method further comprises:

configuring, based on the first information, the terminal device to transmit the first data packet to the second access network device.

3. The method according to claim 1, wherein the method further comprises:

receiving second information from the first access network device, wherein the second information indicates a serial number of the first data packet or a start serial number of the first data packet.

4. The method according to claim 1, wherein the method further comprises:

in response to the terminal device not receiving, from the first access network device, second information that indicates a serial number of the first data packet or a start serial number of the first data packet, determining the first data packet as a data packet that is on the first DRB and that is buffered by the terminal device.

5. The method according to claim 1, wherein the first information further indicates that the second access network device determines to use the first DRB, among a plurality of first DRBs, for dual active protocol stack (DAPS) handover, and the method further comprises:

determining, from the plurality of first DRBs and based on configuration information of a logical channel associated with each of the plurality of first DRBs, at least one second DRB to carry the first data packet.

6. The method according to claim 5, wherein the configuration information of the logical channel comprises at least one of:

a logical channel priority configuration, a physical layer priority index of the logical channel, or a duration threshold of an uplink data channel corresponding to the logical channel.

7. The method according to claim 1, wherein the method further comprises:

configuring, based on the first information, the terminal device to send the first data packet and a second data packet to the first access network device after the terminal device successfully accesses the second access network device, wherein the second data packet is a data packet that has not been sent by the terminal device to the first access network device before the terminal device successfully accesses the second access network device.

8. A data transmission method, wherein the method comprises:

sending, by a first access network device, a handover request message to a second access network device, wherein the handover request message carries an identifier of a terminal device;

receiving, by the first access network device and from the second access network device, a handover acknowledgment message to configure the terminal device to transmit a first data packet to the second access network device, wherein the first data packet is a data packet that has been sent by the terminal device to the first access network device before the terminal device successfully accesses the second access network device, and the first data packet is carried on a first data radio bearer (DRB) of unacknowledged mode (UM) radio link control (RLC); and sending, by the first access network device, first information to the terminal device, wherein the first information indicates the terminal device to be handed over and connected to the second access network device, and the first information comprises the handover acknowledgment message.

9. The method according to claim 8, wherein the method further comprises:

sending, by the first access network device, second information to the terminal device, wherein the second information indicates a serial number of the first data packet or a start serial number of the first data packet.

10. The method according to claim 8, wherein the first information is further used to configure the terminal device to send the first data packet and a second data packet to the first access network device after the terminal device successfully accesses the second access network device, and the second data packet is a data packet that has not been sent by the terminal device to the first access network device before the terminal device successfully accesses the second access network device.

11. A data transmission apparatus, wherein the apparatus comprises:

at least one processor; and a memory coupled to the at least one processor and configured to store executable instructions for execution by the at least one processor to instruct the at least one processor to:

receive first information from a first access network device, wherein the first information indicates the apparatus to be handed over and connected to a second access network device; and send a first data packet to the second access network device after the apparatus successfully accesses the second access network device, wherein the first data packet is a data packet that has been sent by the apparatus to the first access network device before the apparatus successfully accesses the second access network device, and the first data packet is carried on a first data radio bearer (DRB) of unacknowledged mode (UM) radio link control (RLC).

12. The apparatus according to claim 11, wherein the executable instructions further instruct the at least one processor to:

configure, based on the first information, the apparatus to transmit the first data packet to the second access network device.

13. The apparatus according to claim 11, wherein the executable instructions further instruct the at least one processor to:

receive second information from the first access network device, wherein the second information indicates a serial number of the first data packet or a start serial number of the first data packet.

14. The apparatus according to claim 11, wherein the executable instructions further instruct the at least one processor to:

in response to the apparatus not receiving, from the first access network device, second information that indicates a serial number of the first data packet or a start serial number of the first data packet, determine the first data packet as a data packet that is on the first DRB and that is buffered by the apparatus.

15. The apparatus according to claim 11, wherein the first information further indicates that the second access network device determines to use the first DRB, among a plurality of first DRBs, for dual active protocol stack (DAPS) handover, and the executable instructions further instruct the at least one processor to:

determine, from the plurality of first DRBs and based on configuration information of a logical channel associated with each of the plurality of first DRBs, at least one second DRB to carry the first data packet.

16. The apparatus according to claim 15, wherein the configuration information of the logical channel comprises at least one of:

a logical channel priority configuration, a physical layer priority index of the logical channel, or a duration threshold of an uplink data channel corresponding to the logical channel.

17. The apparatus according to claim 11, wherein the executable instructions further instruct the at least one processor to:

configure, based on the first information, the apparatus to send the first data packet and a second data packet to the first access network device after the apparatus successfully accesses the second access network device, wherein the second data packet is a data packet that has not been sent by the apparatus to the first access network device before the apparatus successfully accesses the second access network device.

18. A data transmission apparatus, wherein the apparatus comprises:

at least one processor; and a memory coupled to the at least one processor and configured to store executable instructions for execution by the at least one processor to instruct the at least one processor to:

send a handover request message to a second access network device, wherein the handover request message carries an identifier of a terminal device;

receive, from the second access network device, a handover acknowledgment message to configure the terminal device to transmit a first data packet to the second access network device, wherein the first data packet is a data packet that has been sent by the terminal device to the apparatus before the terminal device successfully accesses the second access network device, and the first data packet is carried on a first data radio bearer (DRB) of unacknowledged mode (UM) radio link control (RLC); and send first information to the terminal device, wherein the first information indicates the terminal device to be handed over and connected to the second access network device, and the first information comprises the handover acknowledgment message.

19. The apparatus according to claim 18, wherein the executable instructions further instruct the at least one processor to:

send second information to the terminal device, wherein the second information indicates a serial number of the first data packet or a start serial number of the first data packet.

20. The apparatus according to claim 18, wherein the first information is further used to configure the terminal device to send the first data packet and a second data packet to the apparatus after the terminal device successfully accesses the second access network device, and the second data packet is a data packet that has not been sent by the terminal device to the apparatus before the terminal device successfully accesses the second access network device.

* * * * *